US012812150B2

(12) United States Patent
Fujimoto

(10) Patent No.: US 12,812,150 B2
(45) **Date of Patent: *Nov. 24, 2026**

(54) IMAGE PROCESSING APPARATUS AND METHOD FOR INTRA PREDICTION OF QUADTREE BLOCKS

(71) Applicant: Sony Group Corporation, Tokyo (JP)

(72) Inventor: Yuji Fujimoto, Tokyo (JP)

(73) Assignee: Sony Group Corporation, Tokyo (JP)

( * ) Notice: Subject to any disclaimer, the term of this patent is extended or adjusted under 35 U.S.C. 154(b) by 35 days.

This patent is subject to a terminal disclaimer.

(21) Appl. No.: 18/988,985

(22) Filed: Dec. 20, 2024

(65) Prior Publication Data

US 2025/0126283 A1 Apr. 17, 2025

Related U.S. Application Data

(63) Continuation of application No. 18/477,580, filed on Sep. 29, 2023, now Pat. No. 12,244,837, which is a (Continued)

(30) Foreign Application Priority Data

Dec. 21, 2018 (JP) ................................ 2018-240108

(51) Int. Cl.
*H04N 19/436* (2014.01)
*H04N 19/176* (2014.01)

(Continued)

(52) U.S. Cl.
CPC ......... *H04N 19/436* (2014.11); *H04N 19/176* (2014.11); *H04N 19/503* (2014.11);

(Continued)

(58) Field of Classification Search
CPC ............... H04N 19/436; H04N 19/176; H04N 19/503; H04N 19/593; H04N 19/91; H04N 19/96

(Continued)

(56) References Cited

U.S. PATENT DOCUMENTS

| | | | |
|---|---|---|---|
| 11,800,123 | B2 | 10/2023 | Fujimoto |
| 2013/0044806 | A1 | 2/2013 | Huang |

(Continued)

FOREIGN PATENT DOCUMENTS

| | | | |
|---|---|---|---|
| CN | 1956546 | A | 5/2007 |
| CN | 104904210 | A | 9/2015 |

(Continued)

OTHER PUBLICATIONS

Lai et al., "AHG14: Intra Block Copy Reference Area for Wavefront Parallel Processing (WPP)," JCTVC-S0101, (Oct. 2014). (Year: 2014).*

(Continued)

*Primary Examiner* — Matthew K Kwan

(74) *Attorney, Agent, or Firm* — XSENSUS LLP

(57) ABSTRACT

Coefficient data related to an image is coded in parallel in each line of coding tree units each including transformation blocks and corresponding to a topmost coding block in a tree structure, and coding of each line is performed so as to be delayed by an amount corresponding to one coding tree unit with respect to coding of a line immediately above the line to be coded. Additionally, coded data obtained by coding coefficient data related to an image is decoded in parallel in each line of coding tree units each including transformation blocks and corresponding to a topmost coding block in a tree structure, and decoding of each line is performed so as to be delayed by an amount corresponding to one coding tree unit with respect to decoding of a line immediately above the line to be decoded.

12 Claims, 25 Drawing Sheets

Related U.S. Application Data continuation of application No. 17/295,440, filed as application No. PCT/JP2019/047782 on Dec. 6, 2019, now Pat. No. 11,800,123.

(51) Int. Cl.

| | |
|---|---|
| ***H04N 19/503*** | (2014.01) |
| ***H04N 19/593*** | (2014.01) |
| ***H04N 19/91*** | (2014.01) |
| ***H04N 19/96*** | (2014.01) |

(52) U.S. Cl.

CPC .......... *H04N 19/593* (2014.11); *H04N 19/91* (2014.11); *H04N 19/96* (2014.11)

(58) Field of Classification Search

USPC .................................................... 375/240.12

See application file for complete search history.

(56) References Cited

U.S. PATENT DOCUMENTS

| | | | | |
|---|---|---|---|---|
| 2014/0348226 | A1 | 11/2014 | Kurashige | |
| 2015/0010088 | A1 * | 1/2015 | Henry | H04N 19/184 375/240.12 |
| 2016/0142740 | A1 | 5/2016 | Sharman | |
| 2017/0094271 | A1 | 3/2017 | Liu et al. | |
| 2018/0302645 | A1 | 10/2018 | Laroche et al. | |
| 2020/0137400 | A1 | 4/2020 | Seregin et al. | |
| 2021/0243458 | A1 | 8/2021 | Abe et al. | |
| 2025/0175633 | A1 | 5/2025 | Fujimoto | |

FOREIGN PATENT DOCUMENTS

| | | | |
|---|---|---|---|
| CN | 106464896 | A | 2/2017 |
| CN | 107197296 | A | 9/2017 |
| EP | 3152906 | A | 4/2017 |
| GB | 2531001 | A | 4/2016 |
| JP | 2011-142699 | A | 7/2011 |
| JP | 2013-168913 | A | 8/2013 |
| JP | 2017-525267 | A | 8/2017 |
| KR | 20170020928 | A | 2/2017 |
| WO | 2010/063184 | A1 | 6/2010 |
| WO | 2016/004850 | A1 | 1/2016 |
| WO | 2017/222237 | A1 | 12/2017 |

OTHER PUBLICATIONS

Li et al., "On WPP with Palette Mode and Intra BC Mode," JCTVC-S0088, (Oct. 2014). (Year: 2014).*

Hsu et al., "CE1-Related: Constraint for Binary and Ternary Partitions", Joint Video Experts Team (JVET) of ITU-T SG 16 WP 3 and ISO/IEC JTC 1/SC 29/WG 11, JVET-K0556-v2, Jul. 10-18, 2018, pp. 1-3.

Fujimoto et al., "AHG12: Improved Parallel Processing Capability With WPP", Joint Video Experts Team (JVET) of ITU-T SG 16 WP 3 and ISO/IEC JTC 1/SC 29/WG 11, JVET-M0071-v3, Jan. 9-18, 2019, pp. 1-10.

Tsai et al., "CE1.2.1: Constraint for Binary and Ternary Partitions", Joint Video Experts Team (JVET) of ITU-T SG 16 WP 3 and ISO/IEC JTC 1/SC 29/WG 11, JVET-L0081-v2, Oct. 3-12, 2018, pp. 1-6.

Chuang et al., "CE1-Related: Separate Tree Partitioning at 64x64-luma/32x32-chroma Unit Level", Joint Video Experts Team (JVET) of ITU-T SG 16 WP 3 and ISO/IEC JTC 1/SC 29/WG 11, JVET-K0230-v3, Jul. 10-18, 2018, pp. 1-11.

Telecommunication Standardization Sector of ITU ( International Telecommunication Union, "High Efficiency Video Coding", H.265, Dec. 2016, pp. 1-643.

International Search Report and Written Opinion mailed on Feb. 18, 2020, received for PCT Application PCT/JP2019/047782, Filed on Dec. 6, 2019, 9 pages.

Xu Xiaozhong et al: "Intra Block Copy in HEVC Screen Content Coding Extensions", IEEE Journal on Emerging and Selected Topics in Circuits and Systems, IEEE, Piscataway, NJ, USA, vol. 6, No. 4, Dec. 1, 2016 (Dec. 1, 2016), pp. 409-419, XP011636923,ISSN: 2156-3357, DOI: 10.1109/JETCAS.2016.2597645 [retrieved on Dec. 12, 2016] * Section II *.

Ikai (Sharp) T: "AHG12: One CTU Delay Wavefront Parallel Processing", 126. MPEG Meeting; Mar. 25, 2019-Mar. 29, 2019; Geneva; (Motion Picture Expert Group or ISO/IEC JTC1/SC29/WG11 ), No. m46808 Mar. 21, 2019 (Mar. 21, 2019), XP030209411.

* cited by examiner

FIG. 2

| (Max) CTU Size | $CTU_w$, $CTH_h$ | MAXIMUM PARALLELISM | AVERAGE PARALLELISM |
|---|---|---|---|
| 64x64 | 60, 34 | 30 | 21.2 |
| 128x128 | 30, 17 | 15 | 10.6 |

CTU-BASED WPP PARALLELISM (UNDER IDEAL CONDITION THAT EACH CTU HAS SAME PROCESSING TIME)

- MAXIMUM PARALLELISM = min(ceil($CTU_w$/2), $CTU_h$)
- AVERAGE PARALLELISM = $\Sigma$ p(x, y) / ($CTU_w$ * $CTU_h$)
- $CTU_w$: NUMBER OF CTUs IN HORIZONTAL DIRECTION
- $CTU_h$: NUMBER OF CTUs IN VERTICAL DIRECTION
- p(x, y): PARALLELISM WHEN CTU(x, y) IS PROCESSED

FIG. 5

| | |
|---|---|
| 1 | VPDU COMPATIBLE WPP |
| 1-1 | PARALLELIZATION IN EACH LINE OF CTUs INCLUDING VPDUs AND PIPELINE DELAY CORRESPONDS TO 2 VPDUs (1 CTU) |
| 1-2 | RESTRICT INTRA PREDICTION |
| 1-2-1 | FOR UPPER RIGHT VPDU IN CURRENT CTU, MAKE REFERENCING OF CTU AT UPPER RIGHT OF UPPER RIGHT VPDU UNAVAILABLE |
| 1-3 | RESTRICT INTRA PREDICTION |
| 1-3-1 | FOR UPPER RIGHT VPDU IN CURRENT CTU, MAKE REFERENCING OF CTU AT UPPER RIGHT OF UPPER RIGHT VPDU UNAVAILABLE |
| 1-3-2 | FOR 128xN BLOCK, MAKE MV AT UPPER RIGHT OF 128xN BLOCK UNAVAILABLE |

IMAGE PROCESSING APPARATUS AND METHOD FOR INTRA PREDICTION OF QUADTREE BLOCKS

CROSS-REFERENCE TO RELATED APPLICATIONS

The present application is a continuation of U.S. application Ser. No. 18/477,580, filed Sep. 29, 2023, which is a continuation of U.S. application Ser. No. 17/295,440, filed May 20, 2021 (now U.S. Pat. No. 11,800,123), which is based on PCT filing PCT/JP2019/047782, filed Dec. 6, 2019, which claims priority to JP 2018-240108, filed Dec. 21, 2018, the entire contents of each are incorporated herein by reference.

TECHNICAL FIELD

The present disclosure relates to an image processing apparatus and an image processing method and in particular to an image processing apparatus and an image processing method that are enabled to suppress a decrease in parallelism of coding and decoding.

BACKGROUND ART

WPP (Wavefront Parallel Processing) is conventionally introduced into HEVC (High Efficiency Video Coding) as a tool that parallelizes CABAC (Context-based Adaptive Binary Arithmetic Code) coding in each CTU (Coding Tree Unit) line while minimizing a decrease in coding efficiency (see, for example, NPL 1).

Additionally, a method has been proposed in which a 64×64 block is used as a processing unit for luminance components and a 32×32 block is used as a processing unit for color difference components to perform pipelining on respective steps of processing such as coding (decoding), transformation and quantization (dequantization and inverse transformation), de-blocking, and SAO (Sample Adaptive Offset) (see, for example, NPL 2 and NPL 3).

CITATION LIST

Non Patent Literature

[NPL 1]

TELECOMMUNICATION STANDARDIZATION SECTOR OF ITU (International Telecommunication Union), "High efficiency video coding," H.265, 12/2016

[NPL 2]

Tzu-Der Chuang, Ching-Yeh Chen, Yu-Wen Huang, Shaw-Min Lei, "CE1-related: Separate tree partitioning at 64×64-luma/32×32-chroma unit level," JVET-K0230-v3, Joint Video Experts Team (JVET) of ITU-T SG 16 WP 3 and ISO/IEC JTC 1/SC 29/WG 11 11th Meeting: Ljubljana, SI, 10-18 Jul. 2018

[NPL 3]

Chia-Ming Tsai, Chih-Wei Hsu, Tzu-Der Chuang, Ching-Yeh Chen, Yu-Wen Huang, Shaw-Min Lei, "CE1.2.1: Constraint for binary and ternary partitions," JVET-L0081-v2, Joint Video Experts Team (JVET) of ITU-T SG 16 WP 3 and ISO/IEC JTC 1/SC 29/WG 11 12th Meeting: Macao, CN, 3-12 Oct. 2018

SUMMARY

Technical Problems

However, with increased resolution of images, there has also been a demand to deal with a larger CTU size in coding recently. For example, in a case of HEVC described in NPL 1, the CTU size is up to 64×64. However, in a case of methods described in NPL 2 and NPL 3, the CTU size is up to 128×128.

In WPP, in the same image (specifically, in a case of the same resolution), an increased CTU size as described above reduces the number of CTU lines in one frame. Accordingly, the parallelism of coding and decoding (in other words, the number of CTUs processed in parallel) decreases, possibly resulting in an increased delay in a parallel pipeline (in other words, extended processing time).

Additionally, according to the methods described in NPL 2 and NPL 3, pipelining can be performed on respective steps of processing such as coding (decoding), transformation and quantization (dequantization and inverse transformation), de-blocking, and SAO by using a block with a reduced size as a processing unit, however, it is difficult to perform parallel-pipelining on coding and decoding for each block.

In view of such circumstances, it is an object of the present disclosure to make it possible to suppress a decrease in parallelism of coding and decoding.

Solution to Problems

An image processing apparatus according to an aspect of the present technique includes a coding section that codes coefficient data related to an image in parallel in each line of coding tree units each including transformation blocks and corresponding to a topmost coding block in a tree structure, and that performs coding of each line so as to delay the coding by an amount corresponding to one coding tree unit with respect to coding of a line immediately above the line to be coded.

An image processing method according to an aspect of the present technique include coding coefficient data related to an image in parallel in each line of coding tree units each including transformation blocks and corresponding to a topmost coding block in a tree structure, and performing coding of each line so as to delay the coding by an amount corresponding to one coding tree unit with respect to coding of a line immediately above the line to be coded.

An image processing apparatus according to another aspect of the present technique includes a decoding section that decodes coded data obtained by coding coefficient data related to an image, in parallel in each line of coding tree units each including transformation blocks and corresponding to a topmost coding block in a tree structure, and that performs decoding of each line so as to delay the decoding by an amount corresponding to one coding tree unit with respect to decoding of a line immediately above the line to be decoded.

An image processing method according to another aspect of the present technique includes decoding coded data obtained by coding coefficient data related to an image, in parallel in each line of coding tree units each including transformation blocks and corresponding to a topmost coding block in a tree structure, and performing decoding of each line so as to delay the decoding by an amount corresponding to one coding tree unit with respect to decoding of a line immediately above the line to be decoded.

In the image processing apparatus and image processing method according to an aspect of the present technique, the coefficient data related to the image is coded in parallel in each line of the coding tree units each including the transformation blocks and corresponding to the topmost coding block in the tree structure, and coding of each line is performed so as to be delayed by an amount corresponding to one coding tree unit with respect to coding of the line immediately above the line to be coded.

In the image processing apparatus and image processing method according to another aspect of the present technique, coded data obtained by coding the coefficient data related to the image is decoded in parallel in each line of the coding tree units each including the transformation blocks and corresponding to the topmost coding block in the tree structure, and decoding of each line is performed so as to be delayed by an amount corresponding to one coding tree unit with respect to decoding of the line immediately above the line to be decoded.

BRIEF DESCRIPTION OF DRAWINGS

FIG. 2 is a diagram illustrating an example of a relationship between a parallelism and a block size.

FIG. 5 is a diagram illustrating a method for parallel-pipelining of coding and decoding.

DESCRIPTION OF EMBODIMENTS

Figure 1:
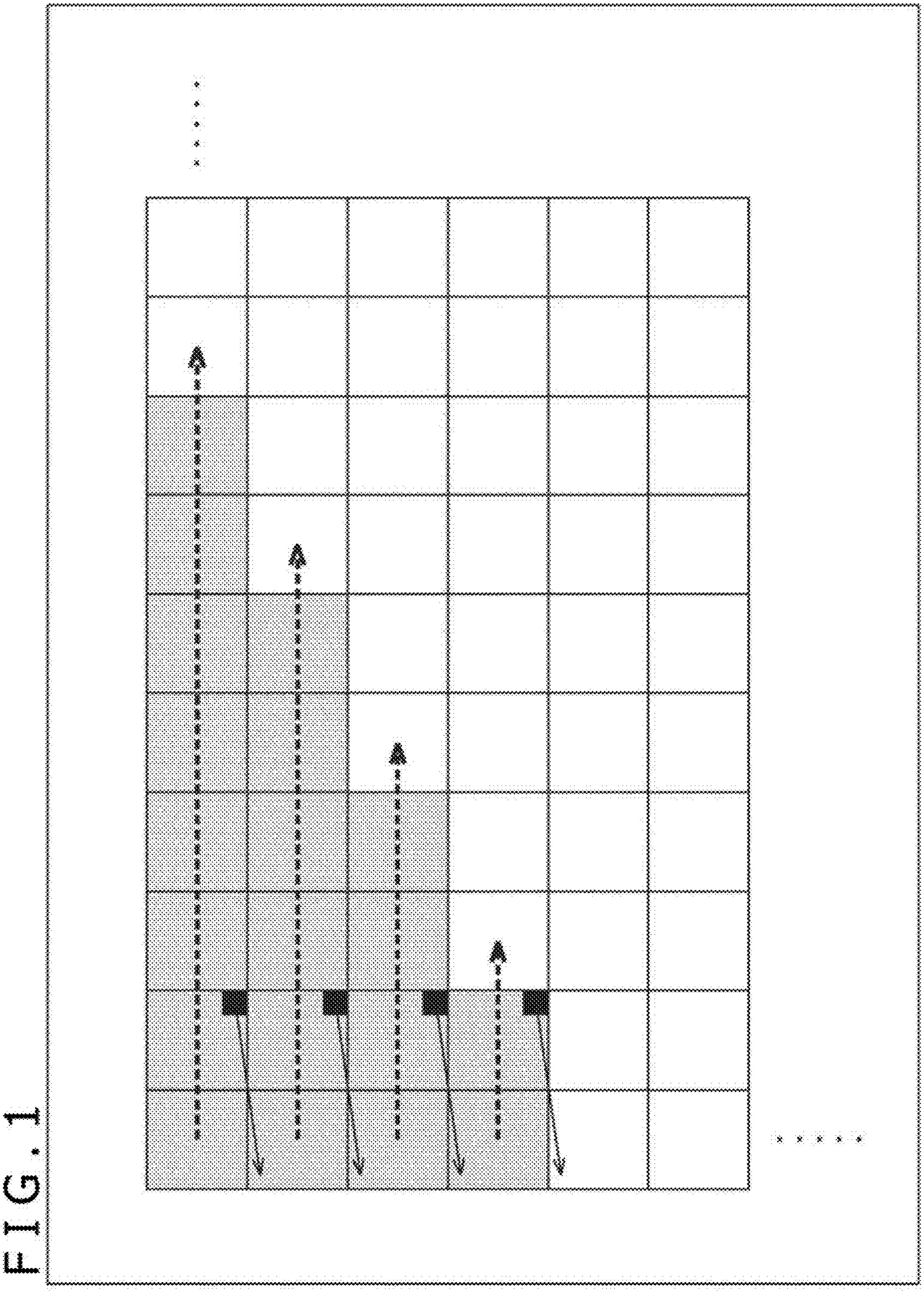
FIG. 1 is a diagram illustrating an example of WPP.

Modes for carrying out the present disclosure (hereinafter referred to as embodiments) will be described below. The description is given in the following order.

1. Documents and the like supporting technical contents and technical terms
2. WPP and VPDU
3. Concepts
4. Method 1
5. First embodiment (image coding apparatus and image decoding apparatus)
6. Supplementary feature

1. Documents and the Like Supporting Technical Contents and Technical Terms

The scope disclosed in the present technique includes contents described in pieces of non-patent literature listed below and known at the time of filing as well as contents described in examples.

NPL 1: (listed above)

NPL 2: (listed above)

NPL 3: (listed above)

NPL 4: TELECOMMUNICATION STANDARDIZATION SECTOR OF ITU (International Telecommunication Union), "Advanced video coding for generic audiovisual services," H.264, 04/2017

NPL 5: Jianle Chen, Elena Alshina, Gary J. Sullivan, Jens-Rainer, Jill Boyce, "Algorithm Description of Joint Exploration Test Model 4," JVET-G1001_v1, Joint Video Exploration Team (JVET) of ITU-T SG 16 WP 3 and ISO/IEC JTC 1/SC 29/WG 11 7th Meeting: Torino, IT, 13-21 Jul. 2017

NPL 6: Benjamin Bross, Jianle Chen, Shan Liu, "Versatile Video Coding (Draft 2)," JVET-K1001-v7, Joint Video Experts Team (JVET) of ITU-T SG 16 WP 3 and ISO/IEC JTC 1/SC 29/WG 11 11th Meeting: Ljubljana, SI, 10-18 Jul. 2018

In other words, the contents described in pieces of the non-patent literature listed above also constitute grounds for determining support requirements. For example, a Quad-Tree Block Structure described in NPL 1 and a QTBT (Quad Tree Plus Binary Tree) Block Structure described in NPL 5 are intended to fall within the disclosure range and to satisfy the support requirements in claims even in a case where the examples include no direct descriptions of such structures. Additionally, for example, technical terms such as Parsing, Syntax, and Semantics are similarly intended to fall within the disclosure range and to satisfy the support requirements in claims even in a case where the examples include no direct descriptions of such terms.

Additionally, a "block" (not a block referring to a processing section) used herein for description as a partial region or a processing unit of an image (picture) indicates any partial region in the picture unless otherwise stated, and the size, shape, characteristics, and the like of the block are not limited. For example, the "blocks" are intended to include any partial region (processing unit) such as TBs (Transform Blocks), TUs (Transform Units), PBs (Prediction Blocks), PUs (Prediction Units), SCUs (Smallest Coding Units), CUs (Coding Units), LCUs (Largest Coding Units), CTBs (Coding Tree Blocks), CTUs (Coding Tree Units), transformation blocks, sub-blocks, macro blocks, tiles, or slices described in NPL 1 to NPL 6 listed above.

Additionally, upon specifying the size of such blocks, indirect specification of the block size may be used as well as direct specification of the block size. For example, identification information for identifying the size may be used to specify the block size. Additionally, for example, the block size may be specified by using the size ratio of the block to a reference block (for example, LCU, SCU, or the like) or a difference between the block and the reference block. For example, in a case where information specifying the block size as a syntax element or the like is transmitted, information indirectly specifying the size as described above may be used as the information. This enables a reduction in the amount of information, possibly allowing coding efficiency to be improved. Additionally, specification of the block size includes specification of the range of the block size (for example, specification of the allowable range of the block size, or the like).

Additionally, coding as used herein includes partial processing as well as the whole processing for transforming an image into a bit stream. For example, coding includes generic processing of quantization and arithmetic coding, comprehensive processing of prediction processing, quantization, and arithmetic coding, and the like, as well as comprehensive processing of prediction processing, orthogonal transformation, quantization, arithmetic coding, and the like. Similarly, decoding includes partial processing as well as the whole processing for transforming a bit stream into an image. For example, decoding includes comprehensive processing of inverse arithmetic decoding and dequantization, comprehensive processing of inverse arithmetic decoding, dequantization, and prediction processing, and the like, as well as comprehensive processing of inverse arithmetic decoding, dequantization, inverse orthogonal transformation, prediction processing, and the like.

2. WPP and VPDU

<WPP>

For example, as described in NPL 1, WPP (Wavefront Parallel Processing) is conventionally introduced into HEVC (High Efficiency Video Coding) as a tool that parallelizes CABAC (Context-based Adaptive Binary Arithmetic Code) coding in each CTU (Coding Tree Unit) line while minimizing a decrease in coding efficiency.

For example, FIG. 1 illustrates a part of an image to be coded, and each square indicates a CTU. The CTUs are arranged in a matrix as illustrated in FIG. 1. In a case where WPP is applied, steps of coding and decoding (entropy coding and entropy decoding) in each row of CTUs (also referred to as each CTU line) are parallelized (steps of processing in each CTU line are executed in parallel). In each CTU line, as illustrated by dashed arrows in the figure, the CTUs are processed (entropy-coded or entropy-decoded) one by one from the leftmost CTU.

Each CTU is processed by using, as a context, an occurrence probability derived during processing of a preceding CTU. However, the leftmost CTU in the uppermost line in the image is processed by using a context with an initial value. Additionally, each of the leftmost CTUs in the second uppermost and subsequent CTU lines is processed by using, as a context, an occurrence probability (also referred to as a learned occurrence probability) derived when the second CTU from the left in a CTU line immediately above a CTU line to be processed (also referred to as a current CTU line) is processed, as indicated by filled squares and arrows in FIG. 1. In other words, as illustrated by gray squares in FIG. 1, each CTU line is processed while being delayed with respect to a CTU line immediately above the CTU line by an amount corresponding to two CTUs.

This allows the respective CTU lines to be processed in parallel (even with timing gaps, processing can be achieved such that at least processing timings partially overlap one another (there is a point of time when the CTUs in a plurality of CTU lines are processed)). Consequently, coding and decoding can be executed faster than a case where all the CTUs in an image are processed in series.

<Decrease in Parallelism>

However, with increased resolution of images, there has also been a demand to deal with a larger CTU size in coding recently. For example, in a case of HEVC described in NPL 1, the CTU size is up to 64×64. However, in a case of methods described in NPL 2 and NPL 3, the CTU size is up to 128×128.

In WPP, in the same image (specifically, in a case of the same resolution), an increased CTU size as described above reduces the number of CTU lines in one frame. Accordingly, the parallelism of coding and decoding (in other words, the number of CTUs processed in parallel) decreases, possibly resulting in an increased delay in a parallel pipeline (in other words, extended processing time).

For example, it is assumed that the same processing time is used for all the CTUs. The maximum parallelism indicating the maximum number of CTUs processed at the same point of time is defined as indicated by the Equation (1). In the Equation (1), CTUw indicates the number of CTUs in the horizontal direction in the image to be processed. Additionally, CTUh indicates the number of CTUs in the vertical direction in the image to be processed. Further, a function ceil indicates rounding up to the closest whole number.

[Math. 1]

$$\text{Maximum parallelism} = \min(\text{ceil}(CTUw/2),\ CTUh) \tag{1}$$

Additionally, the average parallelism indicating the average number of CTUs processed at the same point of time is defined as indicated by the Equation (2). In the Equation (2), p(x, y) indicates the parallelism achieved when CTU(x, y) is processed. Additionally, CTUw and CTUh are similar to CTUw and CTUh in the Equation (1).

[Math. 2]

$$\text{Average parallelism} = \Sigma p(x,\ y)/(CTUw * CTUh) \tag{2}$$

For example, a table in FIG. 2 indicates the results of comparison between the maximum parallelisms and between the average parallelisms achieved when, for example, a 4K image (image with a resolution of 3840×2160) is processed by WPP in a case of a CTU size of up to 64×64 and in a case of a CTU size of up to 128×128.

As indicated by the table in FIG. 2, in the case of a CTU size of up to 64×64, CTUw and CTUh are respectively 60 and 34. Consequently, the Equation (1) and Equation (2) described above indicate that the maximum parallelism is 30, whereas the average parallelism is 21.2. On the other hand, in the case of a CTU size of up to 128×128, CTUw and CTUh are respectively 30 and 17. Consequently, the Equation (1) and Equation (2) described above indicate that the maximum parallelism is 15, whereas the average parallelism is 10.6. Accordingly, the parallelism (maximum parallelism and average parallelism) is reduced to half. Thus, in the case of a CTU size of up to 128×128, there is a possibility that the delay in the parallel pipeline increases and the processing time extends, compared to the case of a CTU size of up to 64×64, as described above.

Additionally, when a processing load varies among the respective CTUs processed in parallel, a waiting time may be needed in order to coordinate the processing timings for the CTU lines with one another. The granularity of parallelism increases as a CTU size increases, making dispersion of variation in CTU processing load more difficult. In other words, the waiting time may increase due to the variation as a CTU size increases, and the increased waiting time may further reduce an actual parallelism, and thus, the reduced actual parallelism may further extend the processing time.

<VPDU>

Additionally, as described in NPL 2 and NPL 3, a method has been proposed in which a 64×64 block is used as a processing unit for luminance components and a 32×32 block is used as a processing unit for color difference components to perform pipelining on respective steps of processing such as coding (decoding), transformation and quantization (dequantization and inverse transformation), de-blocking, and SAO (Sample Adaptive Offset).

Figure 3:
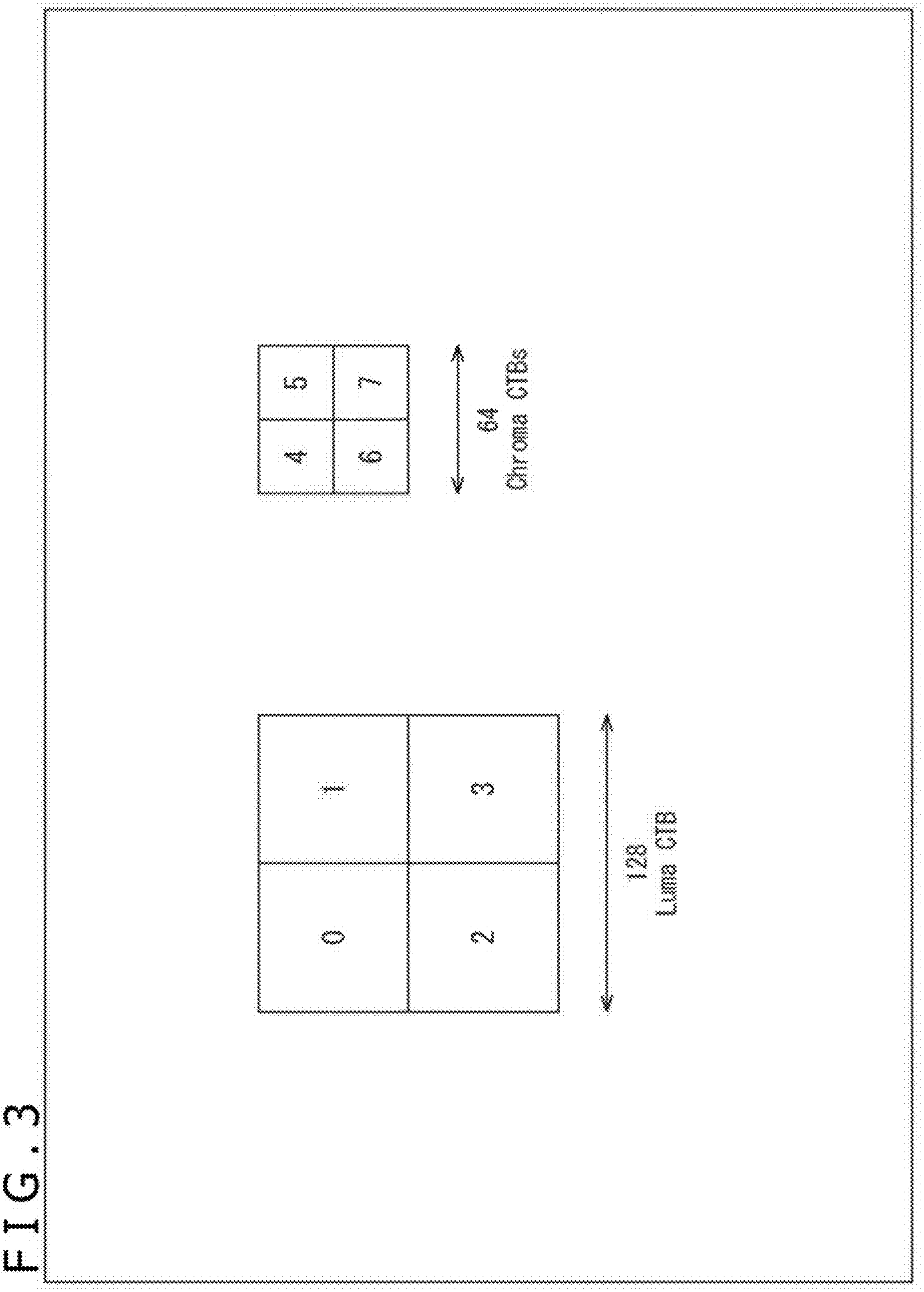
FIG. 3 is a diagram illustrating an example of VPDUs.

For example, as illustrated in FIG. 3, for luminance components, a 128×128 CTB is divided into four pieces (the CTB is divided into two pieces in the vertical direction and into two pieces in the horizontal direction), and a 64×64 block (also referred to as a VPDU (Virtual Pipeline Data Unit)) is used as a processing unit. Additionally, for color difference components, a 64×64 CTB is divided into four pieces (the CTB is divided into two pieces in the vertical direction and into two pieces in the horizontal direction), and a 32×32 block (also referred to as a VPDU) is used as a processing unit.

Figure 4:
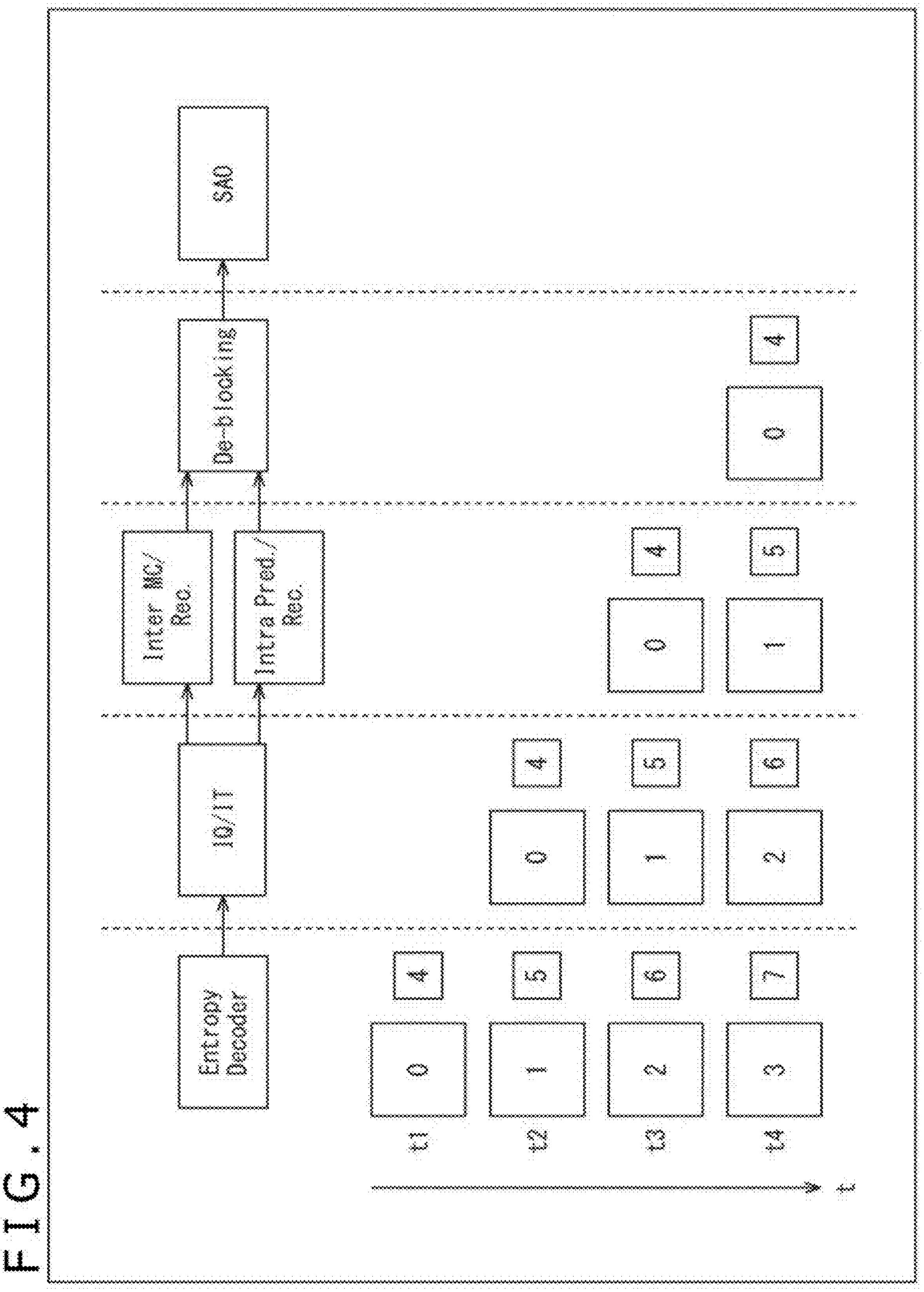
FIG. 4 is a diagram illustrating an example of pipelining using VPDUs.

As illustrated in an example in FIG. 4, pipelining is performed on respective steps of processing such as coding (decoding), transformation and quantization (dequantization and inverse transformation), deblocking, and SAO, by using such a VPDU as a processing unit. This allows suppression of an increase in overall processing time.

However, according to the method, it is difficult to perform parallel-pipelining on coding and decoding in each block.

3. Concepts

<WPP in Each Transformation Block Line>

Thus, as in a method 1 described in the uppermost stage in the table in FIG. 5, WPP that is compatible with VPDUs, that is, parallelization in each CTU line by use of VPDUs, is implemented. A transformation block is a processing unit for transformation processing such as orthogonal transformation executed on image data, and CTU lines indicate rows (lines) of CTUs arranged in a matrix.

As in a method 1-1 described in the second uppermost stage in the table in FIG. 5, coding and decoding may be parallelized in each line of CTUs including VPDUs, and the delay between the lines (pipeline delay) may be set to an amount corresponding to one CTU.

For example, coefficient data related to an image is coded in parallel in each line of coding tree units each including a single or a plurality of transformation blocks and corresponding to the topmost coding block in a tree structure, and coding of each line is performed while being delayed by an amount corresponding to one coding tree unit with respect to coding of a line immediately above the line. Additionally, for example, an image processing apparatus includes a coding section that codes coefficient data related to an image in parallel in each line of coding tree units each including a single or a plurality of transformation blocks and corresponding to the topmost coding block in the tree structure and that performs coding of each line so as to delay the coding by an amount corresponding to one coding tree unit with respect to coding of a line immediately above the line. This reduces the delay between the CTU lines more significantly than the WPP in HEVC, allowing suppression of a decrease in parallelism of coding. This allows suppression of an increase in the processing time for coding.

Additionally, for example, in each line of coding tree units of coefficient data related to an image, the coding tree units may be sequentially coded one by one from the leftmost coding tree unit.

In addition, for example, each coding tree unit may be coded for each transformation block.

Additionally, for example, each transformation block may be entropy-coded by using an occurrence probability derived from entropy coding of a preceding transformation block.

Additionally, for example, the first transformation block in the leftmost coding tree unit in the uppermost line of coding tree units in the image may be entropy-coded by using an initial value of the occurrence probability. Further, for example, the first transformation block in each of the leftmost coding tree units in the second uppermost and subsequent lines of coding tree units in the image may be entropy-coded by using an occurrence probability derived from entropy coding of the last transformation block in the leftmost coding tree unit in a line of coding tree units immediately above the line.

Additionally, for example, transformation blocks may be VPDUs (Virtual Pipeline Data Units).

Additionally, coded data obtained by coding coefficient data related to an image is decoded in parallel in each line of coding tree units each including a single or a plurality of transformation blocks and corresponding to the topmost coding block in the tree structure, and decoding of each line is performed while being delayed by an amount corresponding to one coding tree unit with respect to decoding of a line immediately above the line. Additionally, for example, the image processing apparatus includes a decoding section that decodes coded data obtained by coding coefficient data related to an image in parallel in each line of coding tree units each including a single or a plurality of transformation blocks and corresponding to the topmost coding block in the tree structure and that performs decoding of each line so as to delay the decoding by an amount corresponding to one coding tree unit with respect to decoding of a line immediately above the line. This reduces the delay between the CTU lines more significantly than the WPP in HEVC, allowing suppression of a decrease in parallelism of decoding. This allows suppression of an increase in processing time for decoding.

Additionally, for example, the coded data in each line of coding tree units of the coefficient data related to the image may be decoded such that the coding tree units are sequentially decoded one by one from the leftmost coding tree unit.

Additionally, for example, the coded data of each coding tree unit may be decoded for each transformation block.

In addition, for example, the coded data of each transformation block may be entropy-decoded by using an occurrence probability derived from entropy decoding of the coded data of a preceding transformation block.

Additionally, for example, the coded data of the first transformation block in the leftmost coding tree unit in the uppermost line of coding tree units in the image may be entropy-decoded by using an initial value of the occurrence probability. Further, for example, the coded data of the first transformation block in each of the leftmost coding tree units in the second uppermost and subsequent lines of coding tree units in the image may be entropy-decoded by using an occurrence probability derived from entropy decoding of the coded data of the last transformation block in the leftmost coding tree unit in a line of coding tree units immediately above the line.

Additionally, for example, the transformation blocks may be VPDUs (Virtual Pipeline Data Units).

In addition, as in a method 1-2 described in the third uppermost stage in the table in FIG. 5, intra prediction may be restricted. For example, as in a method 1-2-1 described in the fourth uppermost stage in the table in FIG. 5, in intra prediction of an upper right VPDU in a CTU to be processed (also referred to as the current CTU), referencing of a VPDU (CTU) at the upper right of the upper right VPDU may be inhibited (unavailable).

For example, in the intra prediction of an upper right transformation block in a coding tree unit, referencing of a transformation block at the upper right of the upper right transformation block may be made unavailable. This enables a reduction in dependence relationship between the CTU lines based on the referencing for intra prediction. Therefore, it is possible to suppress an increase in waiting time.

Additionally, as in a method 1-3 described in the fifth uppermost stage in the table in FIG. 5, inter prediction may be restricted. For example, as in a method 1-3-1 described in the sixth uppermost stage in the table in FIG. 5, for inter prediction in which an upper right VPDU in the current CTU is set to a prediction block to be processed (also referred to as a current prediction block), referencing of a VPDU (CTU) at the upper right of the prediction block may be inhibited (unavailable). In other words, restriction may be imposed similarly to the case with the method 1-2-1 described above (that is, the intra prediction may be restricted).

For example, in inter prediction of an upper right transformation block in a coding tree unit, referencing of a transformation block at the upper right of the upper right transformation block may be made unavailable. This enables a reduction in dependence relationship between the CTU lines based on the referencing for inter prediction, allowing suppression of an increase in waiting time.

Additionally, as in a method 1-3-2 described in the seventh uppermost stage in the table in FIG. 5, in the inter prediction in which the current prediction block has a block size of 128×N, referencing of a block at the upper right of the current prediction block may be inhibited (unavailable).

For example, in inter prediction of a prediction block corresponding to a processing unit of the inter prediction and having the same horizontal length as that of a coding tree unit, referencing of a transformation block at the upper right of the prediction block may be made unavailable. This enables a reduction in dependence relationship between the CTU lines based on the referencing for inter prediction, allowing suppression of an increase in waiting time.

4. Method 1

<4-1: Method 1-1>

Figure 6:
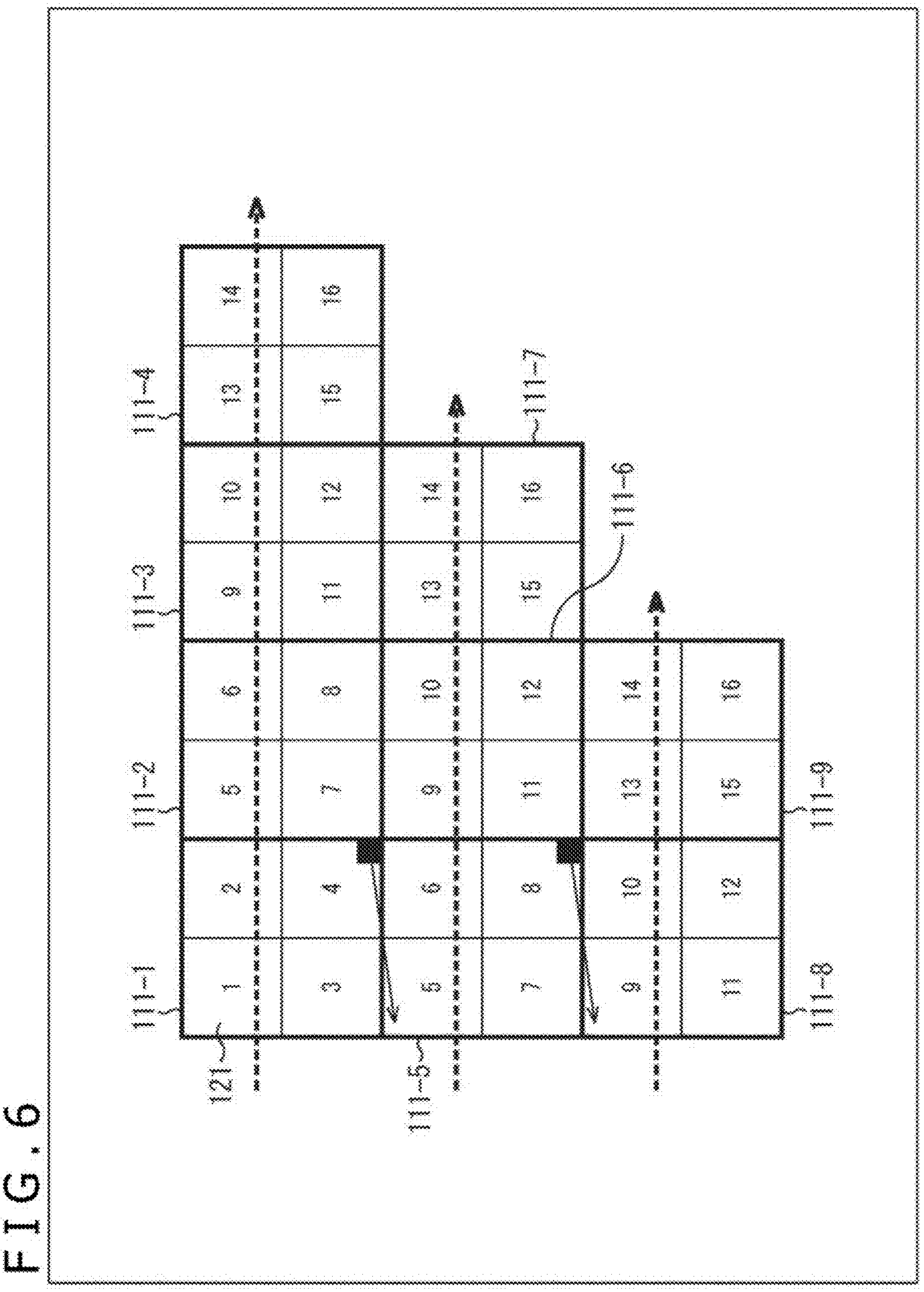
FIG. 6 is a diagram illustrating an example of parallelization in each CTU line by use of VPDUs.

Next, the "method 1" described above will be described in further detail. FIG. 6 illustrates a part of an image to be coded. The image is divided into CTUs 111 corresponding to the topmost coding block in the tree structure. In FIG. 6, respective regions enclosed by thick-line squares are CTUs 111. In the WPP in HEVC, processing (entropy coding and entropy decoding) is parallelized in each line of CTUs 111. In each CTU line, the CTUs are processed one by one from left to right along the CTU line, for example, in order from a CTU 111-1, a CTU 111-2, a CTU 111-3, and a CTU 111-4.

Additionally, each CTU 111 is divided into VPDUs 121. In FIG. 6, respective regions enclosed by thin-line squares are VPDUs 121. In such an example, each CTU 111 is divided into four pieces (into two pieces in the vertical direction and into two pieces in the horizontal direction). For example, the CTU 111-1 is divided into a VPDU 121-1, a VPDU 121-2, a VPDU 121-3, and a VPDU 121-4. In other words, one CTU line is provided with two VPDU lines. Note that the size of the CTU 111 is optional. The size of the VPDU 121 is also optional as long as the VPDU 121 is smaller than the CTU 111. In the description herein, the CTU size is assumed to be 128×128, and the VPDU size is assumed to be 64×64.

In the method 1-1, as indicated by dashed arrows in FIG. 6, processing (entropy coding and entropy decoding) is parallelized in each line of CTUs 111 each including the VPDUs 121. Further, in each CTU line, the CTUs 111 are processed one by one from the leftmost CTU. Additionally, processing of each CTU line is performed while being delayed by an amount corresponding to one CTU with respect to a CTU line immediately above the CTU line.

In FIG. 6, the numbers in the respective VPDUs 121 indicate the order of processing. In other words, the respective CTUs 111 are processed (entropy-coded and entropy-decoded) for each VPDU 121.

In this regard, the entropy coding and the entropy decoding are lossless coding and lossless decoding using, as a context, an occurrence probability derived from preceding processing. For example, the entropy coding and the entropy decoding may be arithmetic coding and arithmetic decoding such as CABAC. The description herein assumes that CABAC is applied. In other words, each VPDU is processed by using, as a context, an occurrence probability derived from processing of a preceding VPDU.

However, the first VPDU (upper left VPDU) in the leftmost CTU in the uppermost CTU line of the image is processed by using a context with an initial value. Additionally, the first VPDU (upper left VPDU) in each of the leftmost CTUs in the second uppermost and subsequent CTU lines is processed by using, as a context, an occurrence probability (also referred to as the learned occurrence probability) derived during processing of the last VPDU (lower right VPDU) in the leftmost CTU in a CTU line immediately above a CTU line to be processed (also referred to as the current CTU line), as indicated by a filled square and an arrow in FIG. 6.

Figure 7:
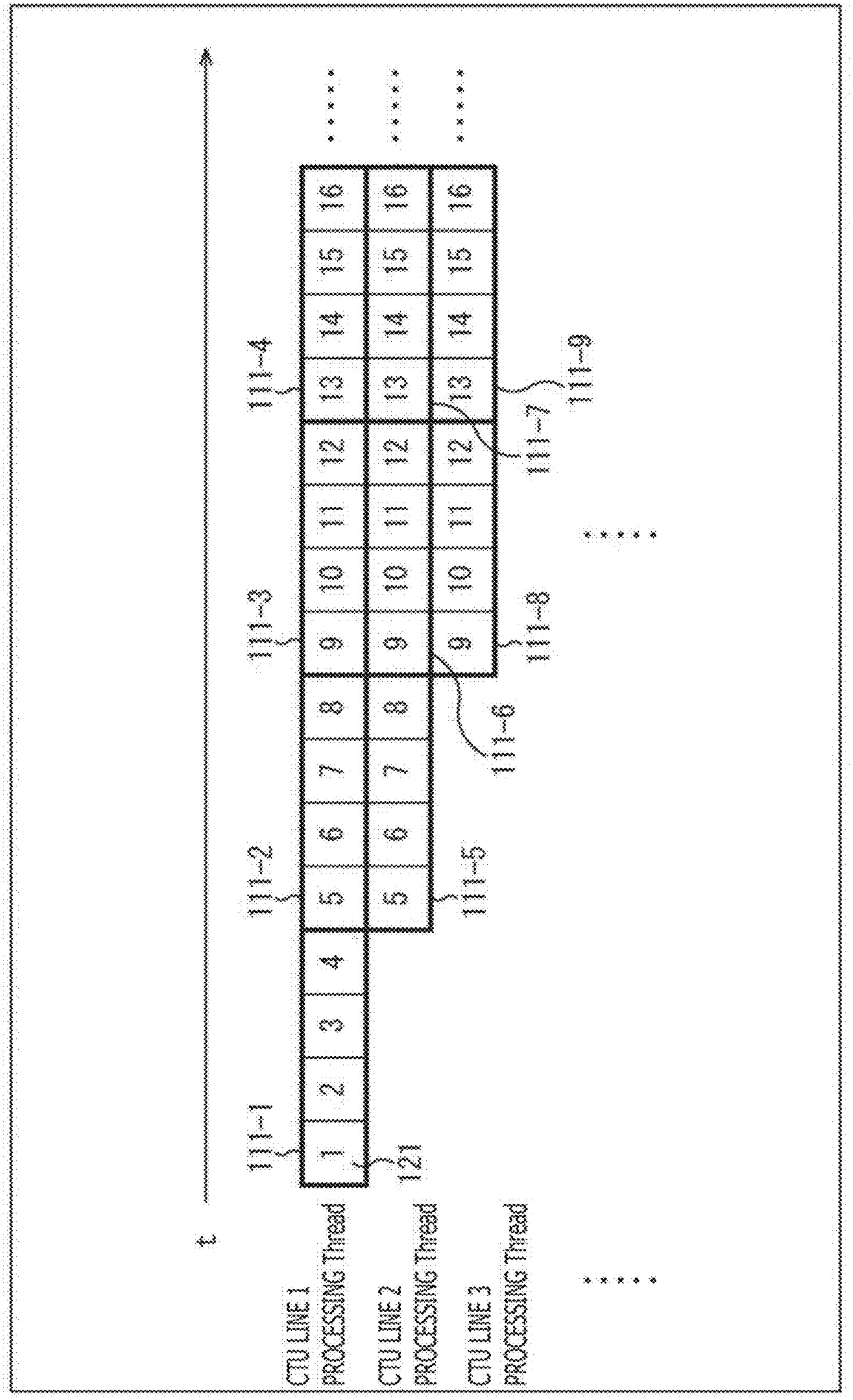
FIG. 7 is a diagram illustrating an example of processing timings for each thread.

Consequently, as illustrated in FIG. 7, a processing thread for each CTU line is delayed by an amount corresponding to one CTU with respect to a processing thread for a CTU line immediately above the CTU line. In spite of a timing gap, a plurality of threads is executed in parallel.

Additionally, restriction of the intra prediction and inter prediction allows the delay between the CTU lines to be adjusted to one CTU. This allows suppression of a decrease in the parallelism of coding and decoding caused by an increased CTU size. Consequently, an increase in the delay in the parallel pipeline can be suppressed, allowing suppression of an increase in processing time. For example, in a case where an image with a 4K image size (3840×2160) is to be processed, the maximum parallelism is 17, and the average parallelism is 13.8.

Note that, in a case where the coding and the decoding are parallelized in each line of CTUs each including a plurality of VPDUs as described above, prediction blocks and transformation blocks are restricted similarly to the case with the pipeline processing of VPDUs described in NPL 2 and NPL 3.

<4-2: Method 1-2>

In the method 1-2, some modes are restricted in the intra prediction. In a case where a block to be processed is in an intra prediction mode, the mode is predicted by referencing the intra prediction mode of an adjacent block, and a prediction image is created by referencing a pixel of the adjacent block.

<4-2-1: Method 1-2-1>

Figure 8:
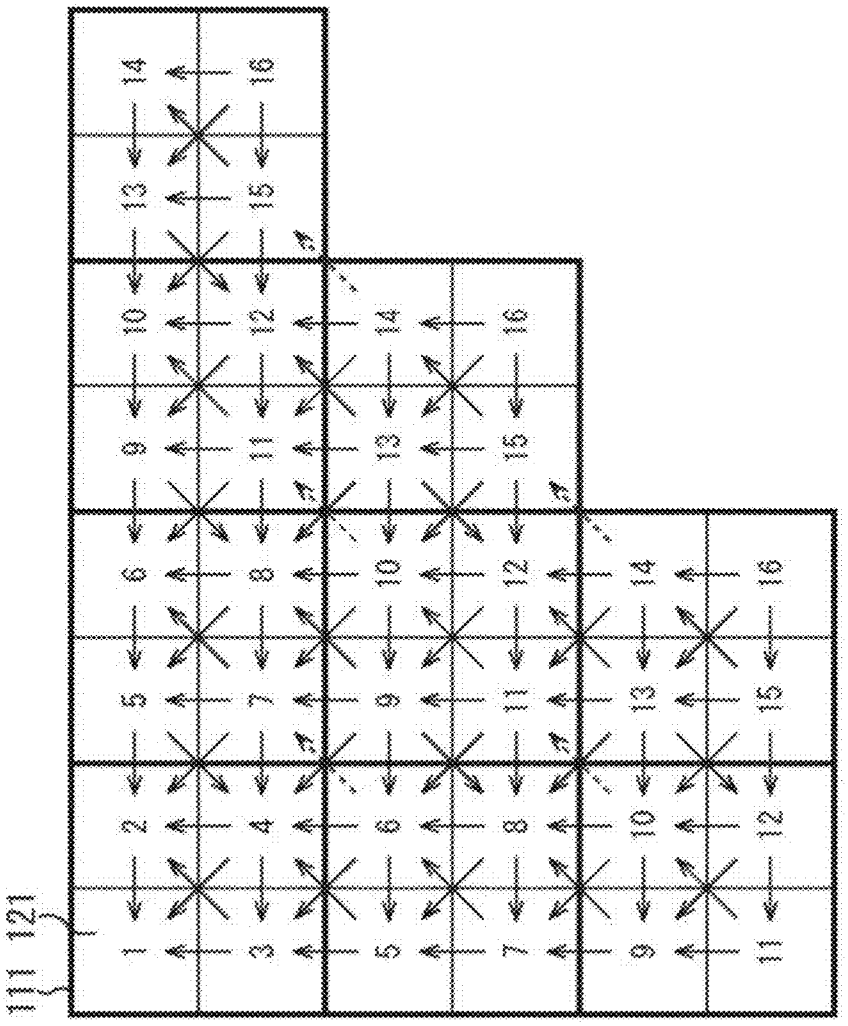
FIG. 8 is a diagram illustrating an example of restriction of referencing for intra prediction.

In the method 1-2-1, as indicated by dashed arrows in FIG. 8, in the intra prediction of an upper right VPDU in a CTU, referencing of a VPDU (CTU) at the upper right of the upper right VPDU is inhibited (unavailable). Specifically, the intra prediction mode and the prediction pixel indicated by the dashed arrows in FIG. 8 are prohibited from being referenced.

Figure 9:
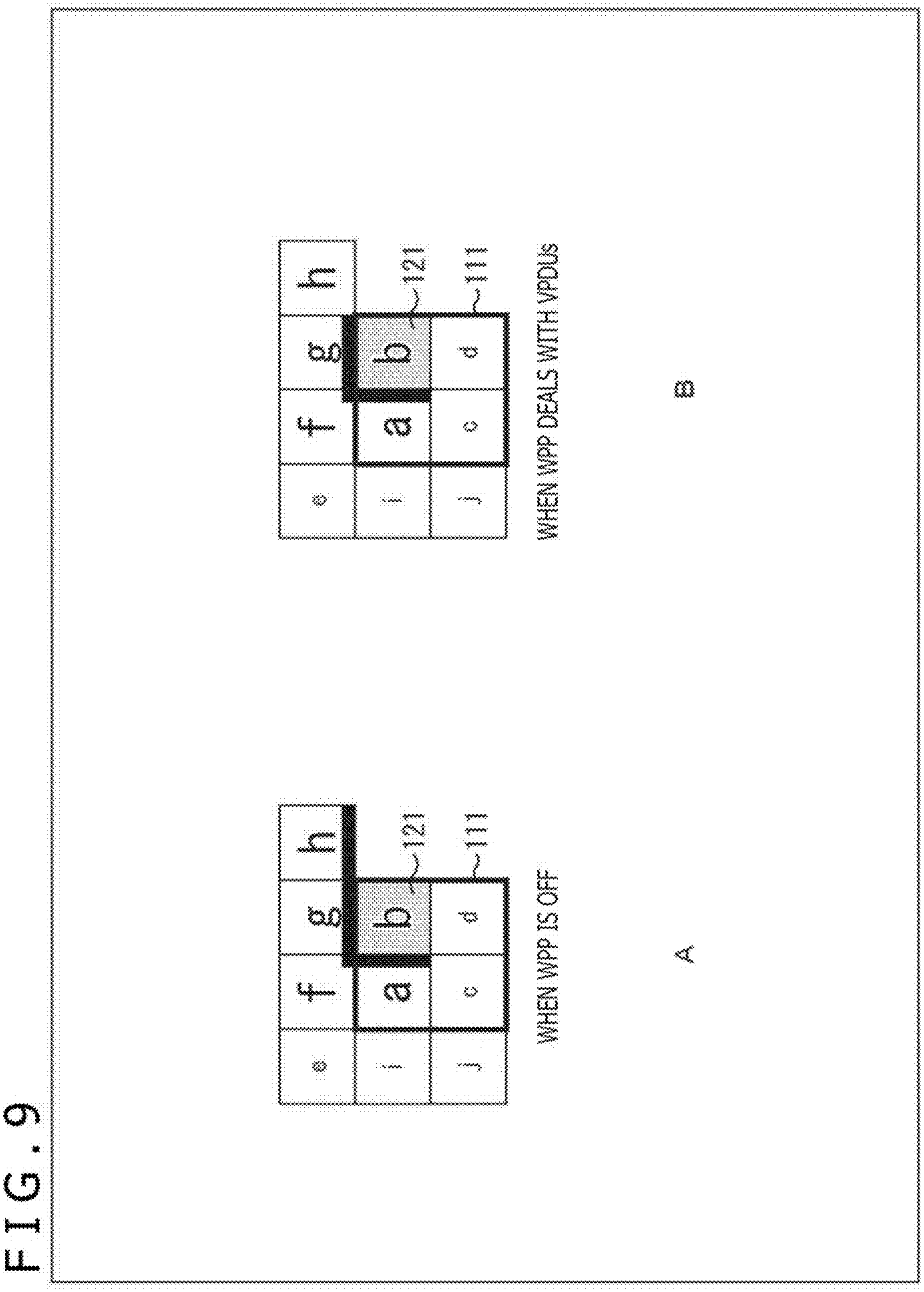
FIG. 9 illustrates examples of the restriction of referencing for intra prediction.

For example, in a case where coding and decoding are not parallelized (during WPP OFF), in the intra prediction of a VPDU[b] corresponding to the upper right VPDU 121 in the current CTU 111, the intra prediction modes of a VPDU[a], a VPDU[f], a VPDU[g], and a VPDU[h] and the adjacent pixel (a black band portion in the figure) are to be referenced as illustrated in A of FIG. 9. In such a case, the intra prediction block size is equal to or less than 64×64 (equal to or less than the VPDU 121), and thus, the reference range is maximized when the intra prediction block size is equal to the VPDU 121.

In contrast, in the method 1-2-1, in a case where coding and decoding are parallelized in each line of CTUs each including VPDUs as in the method 1-1 (during WPP dealing with VPDUs), the intra prediction mode of the VPDU[h] and the adjacent pixel are prohibited from being referenced (referencing is made unavailable) in the intra prediction of the VPDU[b] corresponding to the upper right VPDU 121 in the CTU 111, as illustrated in B of FIG. 9.

In the method 1-1, the processing is parallelized in each CTU line, and the delay between the lines corresponds to one CTU, and thus, the CTU with the VPDU[b] and the CTU with the VPDU[h] can simultaneously be processed. However, the above-described referencing relationship may require the processing of the VPDU[b] to wait until the processing of the VPDU[h] ends (in other words, the waiting time may be extended).

Restriction of the referencing similar to the restriction in the method 1-2-1 can prevent such a referencing relationship for intra prediction from being created (intra prediction can be performed on the VPDU[b] independently of the VPDU [h]), thus allowing suppression of an increase in waiting time.

For the other VPDUs 121 in the CTU 111, even during the WPP dealing with VPDUs, referencing can be made similarly to the case during the WPP OFF. For example, in the intra prediction of the VPDU[a] corresponding to the upper left VPDU 121 in the current CTU 111, as illustrated in A of FIG. 10, the intra prediction modes of a VPDU[e], a VPDU[f], a VPDU[g], a VPDU[i], and a VPDU[j] and the adjacent pixel (black band portion in the figure) are to be referenced both during the WPP OFF and during the WPP dealing with VPDUs. The VPDU[g] at the upper right of the VPDU[a] is also processed before the VPDU[a] during the WPP dealing with VPDUs and can thus be referenced.

Figure 10:
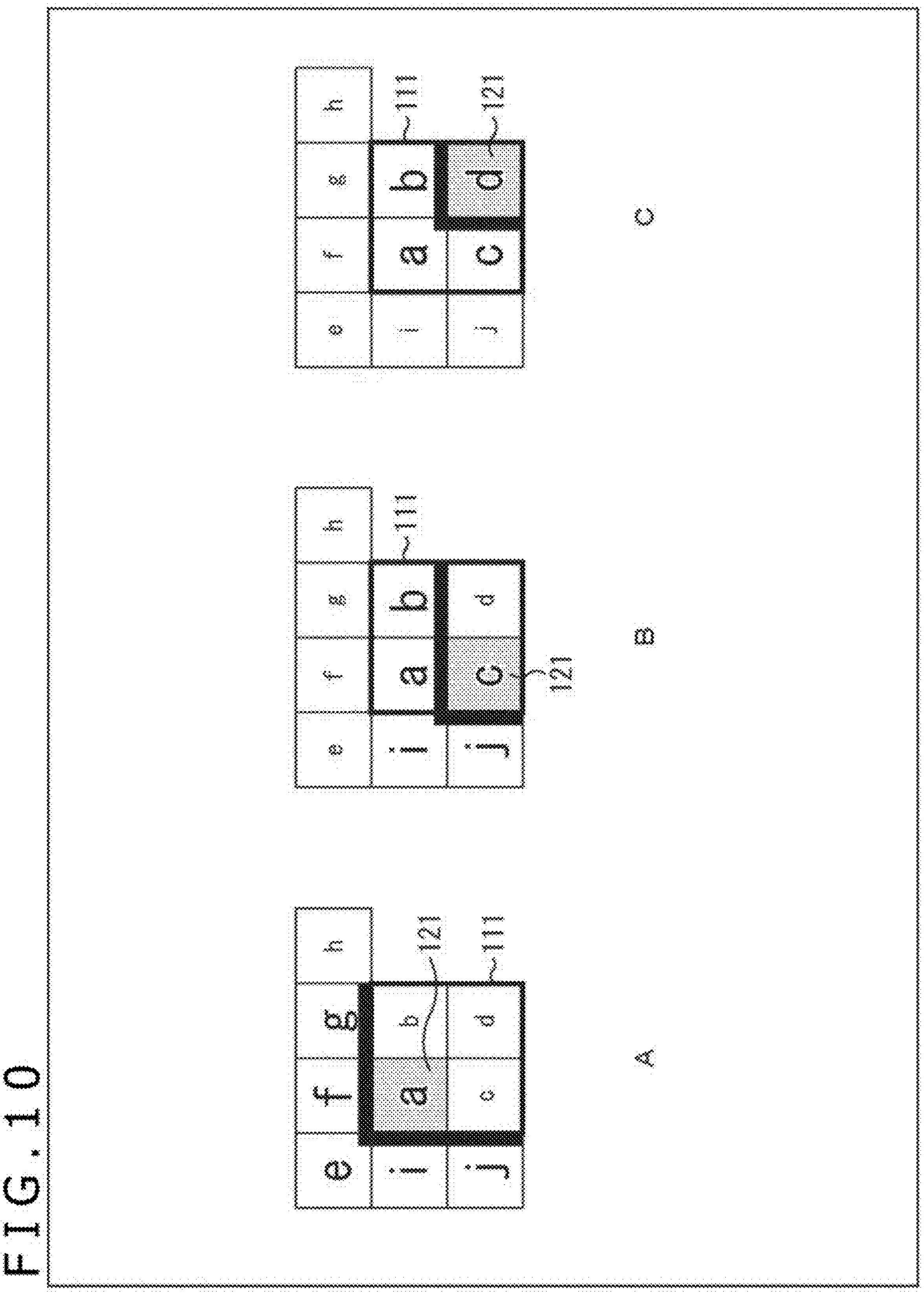
FIG. 10 illustrates examples of the restriction of referencing for intra prediction.

Additionally, for example, in the intra prediction of the VPDU[c] corresponding to the lower left VPDU 121 in the current CTU 111, as illustrated in B of FIG. 10, the intra prediction modes of the VPDU[a], the VPDU[b], the VPDU [i], and the VPDU[j] and the adjacent pixel (black band portion in the figure) are to be referenced both during the WPP OFF and during the WPP dealing with VPDUs. The VPDU[b] at the upper right of the VPDU[c] is also processed before the VPDU[c] during the WPP dealing with VPDUs and can thus be referenced.

Additionally, for example, in the intra prediction of the VPDU[d] corresponding to the lower right VPDU 121 in the current CTU 111, as illustrated in C of FIG. 10, the intra prediction modes of the VPDU[a], the VPDU[b], and the VPDU[c] and the adjacent pixel (black band portion in the figure) are to be referenced both during the WPP OFF and during the WPP dealing with VPDUs. The VPDU at the upper right of the VPDU[d] is processed after the VPDU[d] both during the WPP OFF and during the WPP dealing with VPDUs and is thus prevented from being referenced.

<4-3: Method 1-3>

In the method 1-3, the inter prediction is restricted. In a case where the block to be processed is in the inter prediction mode, the mode is predicted by referencing the inter prediction mode of an adjacent block, and a motion vector of the block to be processed is predicted by referencing a motion vector of the adjacent block.

<4-3-1: Method 1-3-1>

In a method 1-4-1, as indicated by dashed arrows in FIG. 8, in inter prediction of an upper right VPDU in a CTU as the current prediction block, referencing of a VPDU at the upper right of the upper right VPDU is inhibited (unavailable). Specifically, the inter prediction mode and the motion vector indicated by dashed arrows in FIG. 8 are prohibited from being referenced. In other words, a referencing relationship similar to the referencing relationship for intra prediction is made unavailable (restriction is imposed similarly to the case with the method 1-2-1).

This can prevent such a referencing relationship for inter prediction from being created, thus allowing suppression of an increase in waiting time.

For the inter prediction in which each of the other VPDUs 121 in the CTU 111 is used as a current prediction block, referencing similar to the referencing during the WPP OFF can also be made during the WPP dealing with VPDUs, similarly to the case with intra prediction (FIG. 10). Note that, in a case where the inter prediction block size is equal to or less than 64×64 (equal to or less than the VPDU 121), it is sufficient to restrict referencing in the method 1-4-1.

However, in the inter prediction, the block size of the prediction block can be set so as to be greater than 64×64, and can be set to, for example, 128×64, 64×128, 128×128, or the like.

<4-3-2: Method 1-3-2>

In the method 1-3-2, in a case where the current prediction block has a block size of 128×N, referencing of a block at the upper right of the current prediction block is made unavailable.

Figure 11:
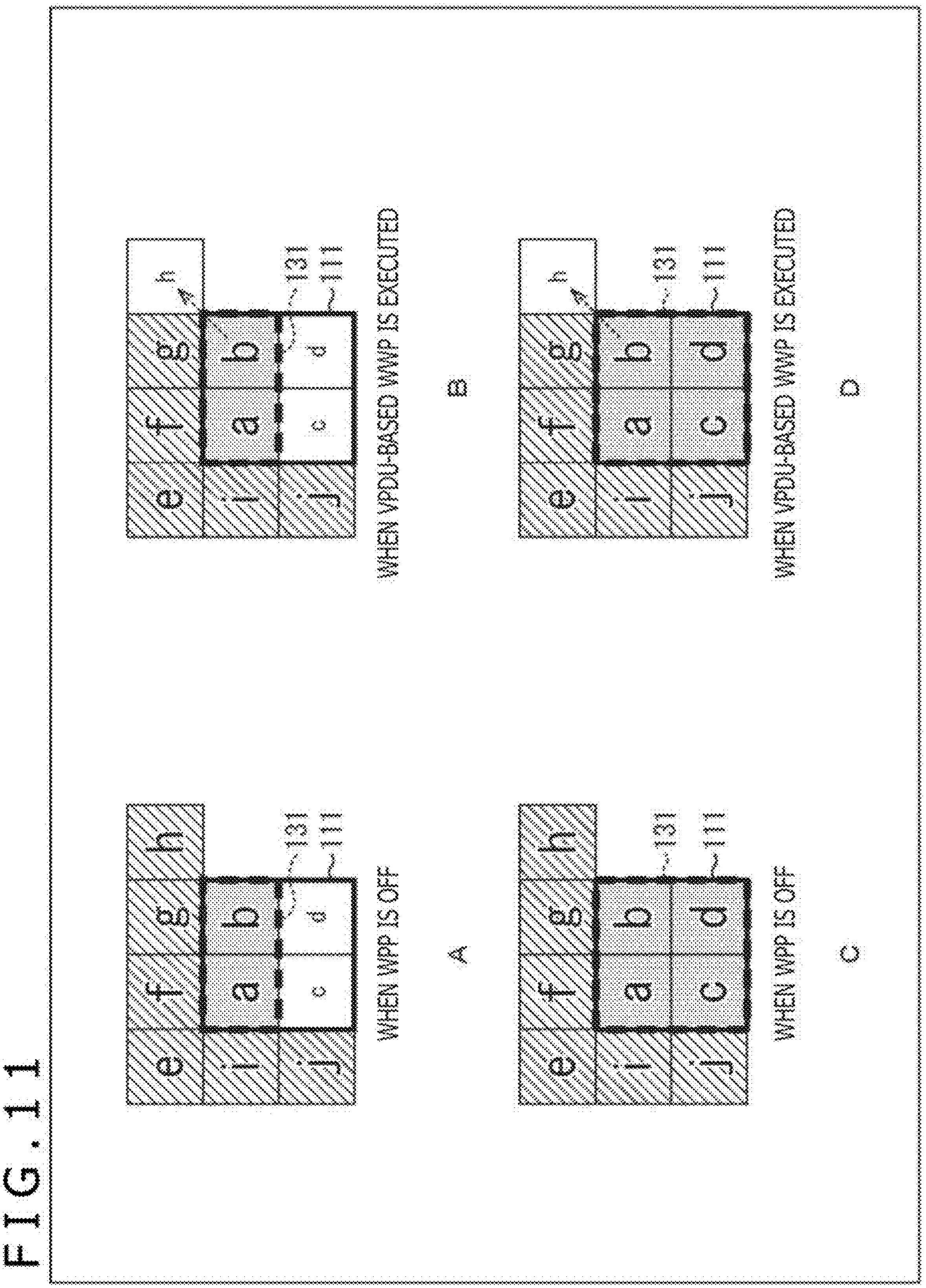
FIG. 11 illustrates examples of restriction of referencing for inter prediction.

For example, in the inter prediction of a prediction block with a block size of 128×64, the inter prediction mode and motion vector of a block at the upper right of the prediction block are prohibited from being referenced (referencing is made unavailable). For example, a prediction block [ab] including the upper left VPDU[a] and the upper right VPDU[b] in the current CTU 111 illustrated in A of FIG. 11 is assumed to be a current prediction block 131. In such a case, during the WPP OFF, the inter prediction modes and motion vectors of the VPDU[e], VPDU[f], VPDU[g], VPDU[h], VPDU[i], and VPDU[j] are to be referenced, as illustrated in A of FIG. 11.

In contrast, in the method 1-3-2, in the inter prediction of the prediction block [ab], the inter prediction mode and motion vector of the VPDU[h] at the upper right of the prediction block [ab] are prohibited from being referenced (referencing is made unavailable) during the WPP dealing with VPDUs, as illustrated in B of FIG. 11.

In the method 1-1, the processing is parallelized in each CTU line, and the delay between the lines corresponds to one CTU, and thus, the VPDU[a] (that is, the prediction block [ab]) and the VPDU[h] can simultaneously be processed. However, the above-described referencing relationship may require the processing of the prediction block [ab] to wait until the processing of the VPDU[h] ends (in other words, the waiting time may be extended).

Restriction of the referencing similar to the restriction in the method 1-3-2 can prevent such a referencing relationship for inter prediction from being created (inter prediction can be performed on the prediction block [ab] independently of the VPDU[h]), thus allowing suppression of an increase in waiting time.

Additionally, in the inter prediction of a prediction block with a block size of 128×128, the inter prediction mode and motion vector of a block at the upper right of the prediction block are similarly prohibited from being referenced (referencing is made unavailable). For example, a prediction block [abcd] including all the VPDUs (VPDU[a], VPDU[b], VPDU[c], and VPDU[d]) in the current CTU 111 illustrated in C of FIG. 11 is assumed to be the current prediction block 131. In such a case, during the WPP OFF, the inter prediction modes and motion vectors of the VPDU[e], VPDU[f], VPDU[g], VPDU[h], VPDU[i], VPDU[j] are to be referenced, as illustrated in C of FIG. 11.

In contrast, in the method 1-3-2, in the inter prediction of the prediction block [abcd], the inter prediction mode and motion vector of the VPDU[h] at the upper right of the prediction block [abcd] are prohibited from being referenced (referencing is made unavailable) during the WPP dealing with VPDUs, as illustrated in D of FIG. 11.

In the method 1-1, the processing is parallelized in each CTU line, and the delay between the lines corresponds to one CTU, and thus, the VPDU[a] (that is, the prediction block [abcd]) and the VPDU[h] can simultaneously be processed. However, the above-described referencing relationship may require the processing of the prediction block [abcd] to wait until the processing of the VPDU[h] ends (in other words, the waiting time may be extended).

Restriction of the referencing similar to the restriction in the method 1-3-2 can prevent such a referencing relationship for inter prediction from being created (inter prediction can be performed on the prediction block [abcd] independently of the VPDU[h]), thus allowing suppression of an increase in waiting time.

Figure 12:
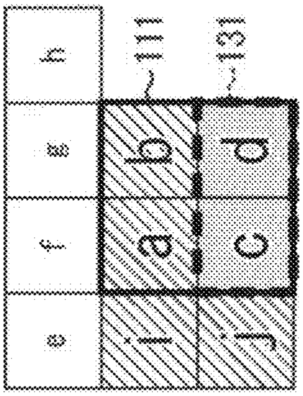
FIG. 12 is a diagram illustrating an example of the restriction of referencing for inter prediction.

Note that, in a case where a prediction block [cd] including the lower left VPDU[c] and the lower right VPDU[d] of the current CTU 111 is used as the current prediction block 131, referencing similar to the referencing during the WPP OFF (referencing of the inter prediction modes and motion vectors of the VPDU[a], VPDU[b], VPDU[i], and VPDU[j]) can also be made during the WPP dealing with VPDUs as illustrated in FIG. 12 (the upper right block is processed later and is thus not referenced even during the WWP OFF).

5. First Embodiment

<5-1: Image Coding Apparatus>

The present technique described above can be applied to any apparatus, device, system, and the like. For example, the present technique described above can be applied to an image coding apparatus that codes image data.

Figure 13:
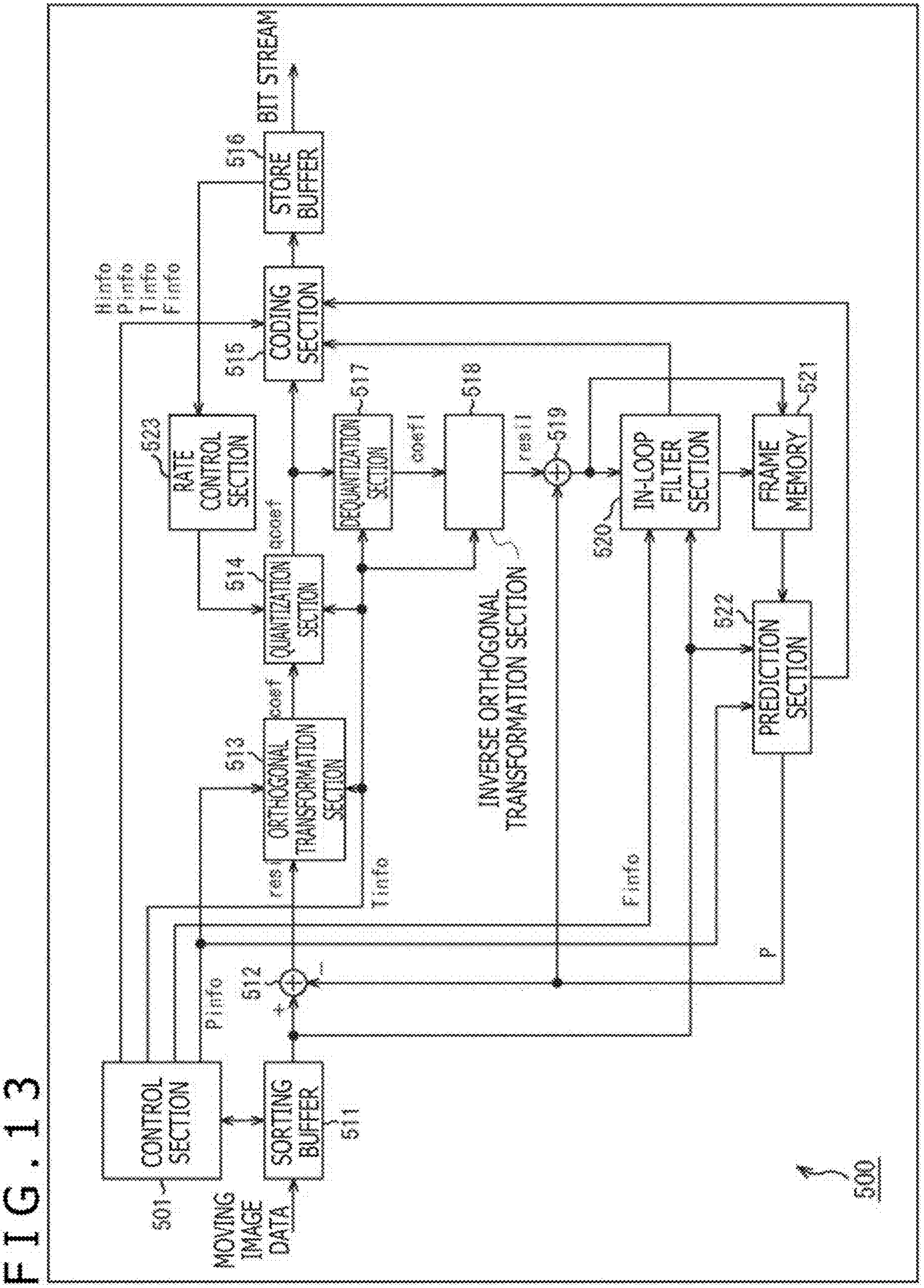
FIG. 13 is a block diagram illustrating a main configuration example of an image coding apparatus.

FIG. 13 is a block diagram illustrating an example of a configuration of an image coding apparatus corresponding to an aspect of the image processing apparatus to which the present technique is applied. An image coding apparatus 500 illustrated in FIG. 13 is an apparatus that codes image data of moving images. For example, the image coding apparatus 500 implements techniques described in NPL 1 to NPL 6 and codes image data of moving images by using a method complying with a standard described in any of these pieces of literature.

Note that FIG. 13 illustrates main elements such as processing sections and flows of data but does not illustrate all the elements of the image coding apparatus 500. In other words, in the image coding apparatus 500, processing sections not illustrated as blocks in FIG. 13 may be present, or flows of processing or data not illustrated as arrows or the like in FIG. 13 may be present.

As illustrated in FIG. 13, the image coding apparatus 500 includes a control section 501, a sorting buffer 511, a calculation section 512, an orthogonal transformation section 513, a quantization section 514, a coding section 515, a store buffer 516, a dequantization section 517, an inverse orthogonal transformation section 518, a calculation section 519, an in-loop filter section 520, a frame memory 521, a prediction section 522, and a rate control section 523.

<Control Section>

On the basis of a block size in an external processing unit or in a processing unit specified in advance, the control section 501 divides moving image data held by the sorting buffer 511, into blocks in the processing unit (CUs, PUs, transformation blocks, or the like). Additionally, the control section 501 determines coding parameters (header information Hinfo, prediction mode information Pinfo, transformation information Tinfo, filter information Finfo, and the like) to be supplied to each block on the basis of RDO (Rate-Distortion Optimization), for example.

The details of the coding parameters will be described below. The control section 501 determines the coding parameters as described above and then feeds the coding parameters to each block. Specifically, this is performed as described below.

The header information Hinfo is fed to each block. The prediction mode information Pinfo is fed to the coding section 515 and the prediction section 522. The transformation information Tinfo is fed to the coding section 515, the orthogonal transformation section 513, the quantization section 514, the dequantization section 517, and the inverse orthogonal transformation section 518. The filter information Finfo is fed to the in-loop filter section 520.

<Sorting Buffer>

The image coding apparatus 500 receives respective fields of moving image data (input images) in order of reproduction (display) of the fields. The sorting buffer 511 acquires the respective input images in order of reproduction (display) of the images and holds (stores) the acquired input images. The sorting buffer 511 sorts the input images into order of coding (decoding) and divides the input images into blocks in the processing unit, under the control of the control section 501. The sorting buffer 511 feeds the respective input images thus processed to the calculation section 512. Additionally, the sorting buffer 511 also feeds the respective input images (original images) to the prediction section 522 and the in-loop filter section 520.

<Calculation Section>

The calculation section 512 receives, as inputs, an image I corresponding to a block in the processing unit and a prediction image P fed by the prediction section 522, and subtracts the prediction image P from the image I as indicated in the Equation (3) to derive a prediction residual resi. The calculation section 512 feeds the prediction residual resi to the orthogonal transformation section 513.

[Math. 3]

$$resi = I - P \tag{3}$$

<Orthogonal Transformation Section>

The orthogonal transformation section 513 receives, as inputs, the prediction residual resi fed from the calculation section 512 and the transformation information Tinfo fed from the control section 501, and performs orthogonal transformation on the prediction residual resi on the basis of the transformation information Tinfo to derive a transformation coefficient coef. The orthogonal transformation section 513 feeds the obtained transformation coefficient coef to the quantization section 514.

<Quantization Section>

The quantization section 514 receives, as inputs, the transformation coefficient coef fed from the orthogonal transformation section 513 and the transformation information Tinfo fed from the control section 501, and scales (quantizes) the transformation coefficient coef on the basis of the transformation information Tinfo. Note that the rate of the quantization is controlled by the rate control section 523. The quantization section 514 feeds the coding section 515 and the dequantization section 517 with the quantized transformation coefficient obtained by the quantization as described above, that is, a quantization transformation coefficient level qcoef.

<Coding Section>

The coding section 515 receives, as inputs, the quantization transformation coefficient level qcoef fed from the quantization section 514, various types of coding parameters fed from the control section 501 (header information Hinfo, prediction mode information Pinfo, transformation information Tinfo, filter information Finfo, and the like), information related to a filter such as a filter coefficient fed from the in-loop filter section 520, and information related to an optimum prediction mode fed from the prediction section 522. The coding section 515 codes the quantization transformation coefficient level qcoef (for example, performs arithmetic coding such as CABAC) to generate a bit sequence.

Additionally, the coding section 515 derives residual information Rinfo from the quantization transformation coefficient level qcoef and codes the residual information Rinfo to generate a bit sequence.

Further, the coding section 515 includes, in the filter information Finfo, the information related to the filter fed from the in-loop filter section 520, and includes, in the prediction mode information Pinfo, the information related to the optimum prediction mode fed from the prediction section 522. The coding section 515 then codes the various types of coding parameters described above (header information Hinfo, prediction mode information Pinfo, transformation information Tinfo, filter information Finfo, and the like) to generate a bit sequence.

Additionally, the coding section 515 multiplexes the bit sequence of various types of information generated as described above, to generate coded data. The coding section 515 feeds the coded data to the store buffer 516.

<Store Buffer>

The store buffer 516 temporarily holds the coded data obtained from the coding section 515. The store buffer 516 outputs the coded data held in the store buffer 516 to the outside of the image coding apparatus 500 at a predetermined timing, for example, as a bit stream or the like. For example, the coded data is transmitted to a decoding side via an optional recording medium, an optional transmission medium, an optional image processing apparatus, and the like. In other words, the store buffer 516 is also used as a transmission section that transmits coded data (bit stream).

<Dequantization Section>

The dequantization section 517 executes processing related to dequantization. For example, the dequantization section 517 receives, as inputs, the quantization transformation coefficient level qcoef fed from the quantization section 514 and the transformation information Tinfo fed from the control section 501, to scale (dequantize) the quantization transformation coefficient level qcoef on the basis of the transformation information Tinfo. Note that the dequantization is inverse processing of the quantization performed in the quantization section 514. The dequantization section 517 feeds the inverse orthogonal transformation section 518 with a transformation coefficient coefI obtained by the dequantization as described above.

<Inverse Orthogonal Transformation Section>

The inverse orthogonal transformation section 518 executes processing related to inverse orthogonal transformation. For example, the inverse orthogonal transformation section 518 receives, as inputs, the transformation coefficient coefI fed from the dequantization section 517 and the transformation information Tinfo fed from the control section 501, and performs inverse orthogonal transformation on the transformation coefficient coefI on the basis of the transformation information Tinfo to derive a prediction residual resiI. Note that the inverse orthogonal transformation is inverse processing of the orthogonal transformation executed in the orthogonal transformation section 513. The inverse orthogonal transformation section 518 feeds the calculation section 519 with the prediction residual resiI obtained by the inverse orthogonal transformation as described above. Note that the inverse orthogonal transformation section 518 is similar to an inverse orthogonal transformation section on a decoding side (described below) and that description of the decoding side (which is given below) can thus be applied to the inverse orthogonal transformation section 518.

<Calculation Section>

The calculation section 519 receives, as inputs, the prediction residual resiI fed from the inverse orthogonal transformation section 518 and the prediction image P fed from the prediction section 522. The calculation section 519 adds the prediction residual resiI and prediction image P corresponding to the prediction residual resiI to derive a local decoded image Rlocal. The calculation section 519 feeds the derived local decoded image Rlocal to the in-loop filter section 520 and the frame memory 521.

<In-Loop Filter Section>

The in-loop filter section 520 executes processing related to in-loop filter processing. For example, the in-loop filter section 520 receives, as inputs, the local decoded image Rlocal fed from the calculation section 519, the filter information Finfo fed from the control section 501, and the input image (original image) fed from the sorting buffer 511. Note that any information is input to the in-loop filter section 520 and that information other than that described above may be input to the in-loop filter section 520. For example, the in-loop filter section 520 may receive, as an input, information such as a prediction mode, motion information, a code amount target value, a quantization parameter QP, a picture type, or blocks (CUs, CTUs, or the like), as necessary.

The in-loop filter section 520 executes filter processing on the local decoded image Rlocal as appropriate on the basis of the filter information Finfo. The in-loop filter section 520 uses the input image (original image) and any other input information for the filter processing, as necessary.

For example, the in-loop filter section 520 applies four in-loop filters including a bilateral filter, a deblocking filter (DBF), an adaptive offset filter (SAO (Sample Adaptive Offset)), and an adaptive loop filter (ALF) in this order. Note that which filter is applied and in which order the filters are applied are optional and that the filter and the order can be selected as appropriate.

Needless to say, the filter processing executed by the in-loop filter section 520 is optional and is not limited to the above-described example. For example, the in-loop filter section 520 may apply a Wiener filter or the like.

The in-loop filter section 520 feeds local decoded image Rlocal subjected to filter processing, to the frame memory 521. Note that, for example, in a case where information related to the filter such as a filter coefficient is transmitted to the decoding side, the in-loop filter section 520 feeds the information related to the filter to the coding section 515.

<Frame Memory>

The frame memory 521 executes processing related to storage of data related to images. For example, the frame memory 521 receives, as inputs, the local decoded image Rlocal fed from the calculation section 519 and the filtered local decoded image Rlocal fed from the in-loop filter section 520, and holds (stores) the local decoded images Rlocal. Additionally, the frame memory 521 uses the local decoded images Rlocal to reconstruct a decoded image R for each picture unit, and holds the decoded image R (stores the decoded image R in a buffer in the frame memory 521). In response to a request from the prediction section 522, the frame memory 521 feeds the decoded image R (or a part of the decoded image R) to the prediction section 522.

<Prediction Section>

The prediction section 522 executes processing related to generation of prediction images. For example, the prediction section 522 receives, as inputs, the prediction mode information Pinfo fed from the control section 501, the input image (original image) fed from the sorting buffer 511, and the decoded image R (or a part of the decoded image R) read out from the frame memory 521. The prediction section 522 uses the prediction mode information Pinfo and the input image (original image) to execute prediction processing such as inter prediction and intra prediction and performs prediction by referencing the decoded image R as a reference image. On the basis of the results of the prediction, the prediction section 522 executes motion compensation processing to generate a prediction image P. The prediction section 522 feeds the generated prediction image P to the calculation section 512 and the calculation section 519. Additionally, the prediction section 522 feeds information related to a prediction mode selected by the above-described processing, that is, related to the optimum prediction mode, to the coding section 515, as necessary.

<Rate Control Section>

The rate control section 523 executes processing related to rete control. For example, the rate control section 523 controls the rate of quantization operation of the quantization section 514 to prevent overflow or underflow, on the basis of the code amount of coded data stored in the store buffer 516.

<Application of the Present Technique>

The present technique described above in <3. Concepts> and <4. Method 1> is applied to the image coding apparatus 500 configured as described above. For example, the "method 1-1" may be applied to the image coding apparatus 500. For example, the control section 501 may set VPDUs 121 in the CTU 111, and the coding section 515 may execute coding in parallel in each line of CTUs 111 including the VPDUs 121. Additionally, the coding section 515 may perform processing of each CTU line so as to delay the processing by an amount corresponding to one CTU with respect to a CTU line immediately above the CTU line.

For example, the coding section 515 may code coefficient data related to an image in parallel in each line of coding tree units each including a single or a plurality of transformation blocks and corresponding to the topmost coding block in the tree structure, and may perform coding of each line so as to delay the coding by an amount corresponding to one coding tree unit with respect to coding of a line immediately above the line.

Additionally, for example, in each line of coding tree units of coefficient data related to an image, the coding section 515 may sequentially code the coding tree units one by one from the leftmost coding tree unit.

In addition, for example, the coding section 515 may code each coding tree unit for each transformation block.

Additionally, for example, the coding section 515 may entropy-code each transformation block by using an occurrence probability derived from entropy coding of a preceding transformation block.

Additionally, for example, the coding section 515 may entropy-code the first transformation block in the leftmost coding tree unit in the uppermost line of coding tree units in the image by using an initial value of the occurrence probability. Further, for example, the coding section 515 may entropy-code the first transformation block in each of the leftmost coding tree units in the second uppermost and subsequent lines of coding tree units in the image by using an occurrence probability derived from entropy coding of the last transformation block in the leftmost coding tree unit in a line of coding tree units immediately above the line.

Additionally, the "method 1-2" may be applied to the image coding apparatus 500. Specifically, the prediction section 522 may restrict some modes in the intra prediction mode. For example, the "method 1-2-1" may be applied to the image coding apparatus 500. Specifically, in the intra prediction of an upper right VPDU in a CTU, the control section 501 may make referencing of a VPDU at the upper right of the upper right VPDU unavailable, and the prediction section 522 may perform the intra prediction under the control of the control section 501. In other words, for the upper right VPDU in the CTU, the prediction section 522 may perform the intra prediction while referencing of the VPDU at the upper right of the upper right VPDU is made unavailable.

For example, in the intra prediction of an upper right transformation block in a coding tree unit, the prediction section 522 may make referencing of a transformation block at the upper right of the upper right transformation block unavailable.

Additionally, the "method 1-3" may be applied to the image coding apparatus 500. Specifically, the prediction section 522 may restrict the inter prediction. For example, the "method 1-3-1" may be applied to the image coding apparatus 500. Specifically, in the inter prediction in which an upper right VPDU in a CTU is used as the current prediction block, the control section 501 may make referencing of the inter prediction mode and motion vector of a VPDU at the upper right of the upper right VPDU unavailable, and the prediction section 522 may perform the inter prediction under the control of the control section 501. In other words, in a case of using the upper right VPDU in the CTU as the current prediction block, the prediction section 522 may perform the inter prediction while referencing of the inter prediction mode and motion vector of the VPDU at the upper right of the upper right VPDU is made unavailable.

For example, in the inter prediction of an upper right transformation block in a coding tree unit, the prediction section 522 may make referencing of a transformation block at the upper right of the upper right transformation block unavailable.

Additionally, for example, the "method 1-3-2" may be applied to the image coding apparatus 500. Specifically, in the inter prediction of a prediction block with a block size of 128×N, the control section 501 may prohibit referencing of the inter prediction mode and motion vector of a block at the upper right of the prediction block (make referencing of the inter prediction mode and motion vector of the block at the upper right of the prediction block unavailable), and the prediction section 522 may perform the inter prediction under the control of the control section 501. In other words, the prediction section 522 may perform the inter prediction while referencing of the block at the upper right of the current prediction block with a block size of 128×N is made unavailable.

For example, in the inter prediction of a prediction block that is used as a processing unit of the inter prediction and has the same horizontal length as that of a coding tree unit corresponding to the topmost coding block in the tree structure, the prediction section 522 may make referencing of a transformation block at the upper right of the prediction block unavailable.

Such a configuration enables the image coding apparatus 500 to suppress a decrease in parallelism of coding, allowing suppression of an increase in processing time.

<5-2: Flow of Processing>

<Flow of Image Coding Processing>

Next, a flow of each type of processing executed by the image coding apparatus 500 as described above will be described. First, with reference to a flowchart in FIG. 14, an example of a flow of image coding processing will be described.

When image coding processing is started, in step S101, the sorting buffer 511 sorts frames in input moving image data to change the order of frames from the order of display to the order of coding, under the control of the control section 501.

In step S102, the control section 501 sets the processing unit for the input image held by the sorting buffer 511 (performs block division).

In step S103, the control section 501 determines (sets) the coding parameters for the input image held by the sorting buffer 511. At this time, the control section 501 makes a setting related to the restriction of the intra prediction and the inter prediction described above, as necessary. The setting is fed to the prediction section 522, for example, as the prediction mode information Pinfo.

In step S104, under the control of the control section 501, the prediction section 522 executes prediction processing to generate a prediction image in the optimum prediction mode or the like. The details of the prediction processing will be described below.

In step S105, the calculation section 512 calculates a difference between the input image and the prediction image in the optimum mode selected by the prediction processing in step S104. In other words, the calculation section 512 generates a prediction residual resi between the input image and the prediction image. The prediction residual resi thus determined has a less data amount than the original image data. Consequently, this enables a reduction in data amount compared to the case of direct coding of the image.

In step S106, the orthogonal transformation section 513 executes orthogonal transformation processing on the prediction residual resi generated by the processing in step S105 to derive a transformation coefficient coef.

In step S107, the quantization section 514, for example, uses the quantization parameter calculated by the control section 501 to quantize the transformation coefficient coef obtained by the processing in step S106, deriving a quantization transformation coefficient level qcoef.

In step S108, the dequantization section 517 uses characteristics corresponding to the characteristics of the quantization in step S107 to dequantize the quantization transformation coefficient level qcoef generated by the processing in step S107, deriving a transformation coefficient coefI.

In step S109, the inverse orthogonal transformation section 518 uses a method corresponding to the orthogonal transformation processing in step S106 to execute inverse orthogonal transformation on the transformation coefficient coefI obtained by the processing in step S108, deriving a prediction residual resiI. Note that the inverse orthogonal transformation processing is similar to inverse orthogonal transformation section executed on the decoding side (described below) and that description of the decoding side (given below) can thus be applied to the inverse orthogonal transformation processing in step S109.

In step S110, the calculation section 519 adds the prediction image obtained by the prediction processing in step S104 to the prediction residual resiI derived from the processing in step S109 to generate a decoded image that is locally decoded.

In step S111, the in-loop filter section 520 executes in-loop filter processing on the decoded image locally decoded and derived from the processing in step S110.

In step S112, the frame memory 521 stores the decoded image locally decoded and derived from the processing in step S110 and the decoded image locally decoded and filtered in step S111.

In step S113, the coding section 515 executes coding processing to code the quantization transformation coefficient level qcoef obtained by the processing in step S107. For example, the coding section 515 codes, by arithmetic coding or the like, the quantization transformation coefficient level qcoef corresponding to information related to an image to generate coded data. Additionally, at this time, the coding section 515 codes various types of coding parameters (header information Hinfo, prediction mode information Pinfo, and transformation information Tinfo). Further, the coding section 515 derives residual information Rinfo from the quantization transformation coefficient level qcoef, and codes the residual information Rinfo. The details of the coding processing will be described.

In step S114, the store buffer 516 stores the coded data thus obtained and outputs the coded data to the outside of the image coding apparatus 500, for example, as a bit stream. The bit stream is transmitted to the decoding side, for example, via a transmission path or a recording medium. Additionally, the rate control section 523 executes rate control, as necessary.

When the processing in step S114 ends, the image coding processing ends.

In the coding processing executed in step S113 of the image coding processing, the coding section 515 codes coefficient data related to an image in parallel in each line of coding tree units each including a single or a plurality of transformation blocks and corresponding to the topmost coding block in the tree structure, and performs coding of each line so as to delay the coding by an amount corresponding to one coding tree unit with respect to coding of a line immediately above the line. This enables the image coding apparatus 500 to suppress a decrease in the parallelism of coding, allowing suppression of an increase in processing time.

<Flow of Prediction Processing>

Next, an example of a flow of prediction processing executed in step S104 in FIG. 14 will be described with reference to a flowchart in FIG. 15.

When the prediction processing is started, in step S131, for the intra prediction of an upper right VPDU in a CTU, the control section 501 makes referencing of a VPDU at the upper right of the upper right VPDU unavailable. In step S132, the prediction section 522 performs the intra prediction according to the setting in step S131. In other words, the prediction section 522 performs the intra prediction of each VPDU, and in a case where the upper right VPDU in the CTU is to be processed, the prediction section 522 performs the intra prediction while referencing of the VPDU at the upper right of the upper right VPDU is made unavailable.

In step S133, for the inter prediction of a prediction block including the upper right VPDU in the CTU, the control section 501 makes referencing of a VPDU at the upper right of the prediction block unavailable. Additionally, in step S134, for the inter prediction of a prediction block with a block size of 128×N, the control section 501 makes referencing of a block at the upper right of the prediction block unavailable. In step S135, the prediction section 522 performs the inter prediction according to the settings in step S133 and step S134. In other words, the prediction section 522 performs the inter prediction of each prediction block, and in a case where the prediction block including the upper right VPDU in the CTU is to be processed, the prediction section 522 performs the inter prediction while referencing of the VPDU at the upper right of the prediction block is made unavailable, and in a case where the prediction block with a block size of 128×N is to be processed, the prediction section 522 performs the inter prediction while referencing of the block at the upper right of the prediction block is made unavailable.

In step S136, the prediction section 522 selects the optimum prediction mode on the basis of processing results in step S132 and processing results in step S135. In other words, the prediction section 522 performs the intra prediction to generate a prediction image in the optimum intra prediction mode or the like, performs the inter prediction to generate a prediction image in the optimum inter prediction mode or the like, and selects the optimum prediction mode from the above-described modes on the basis of a cost function and the like.

Figure 14:
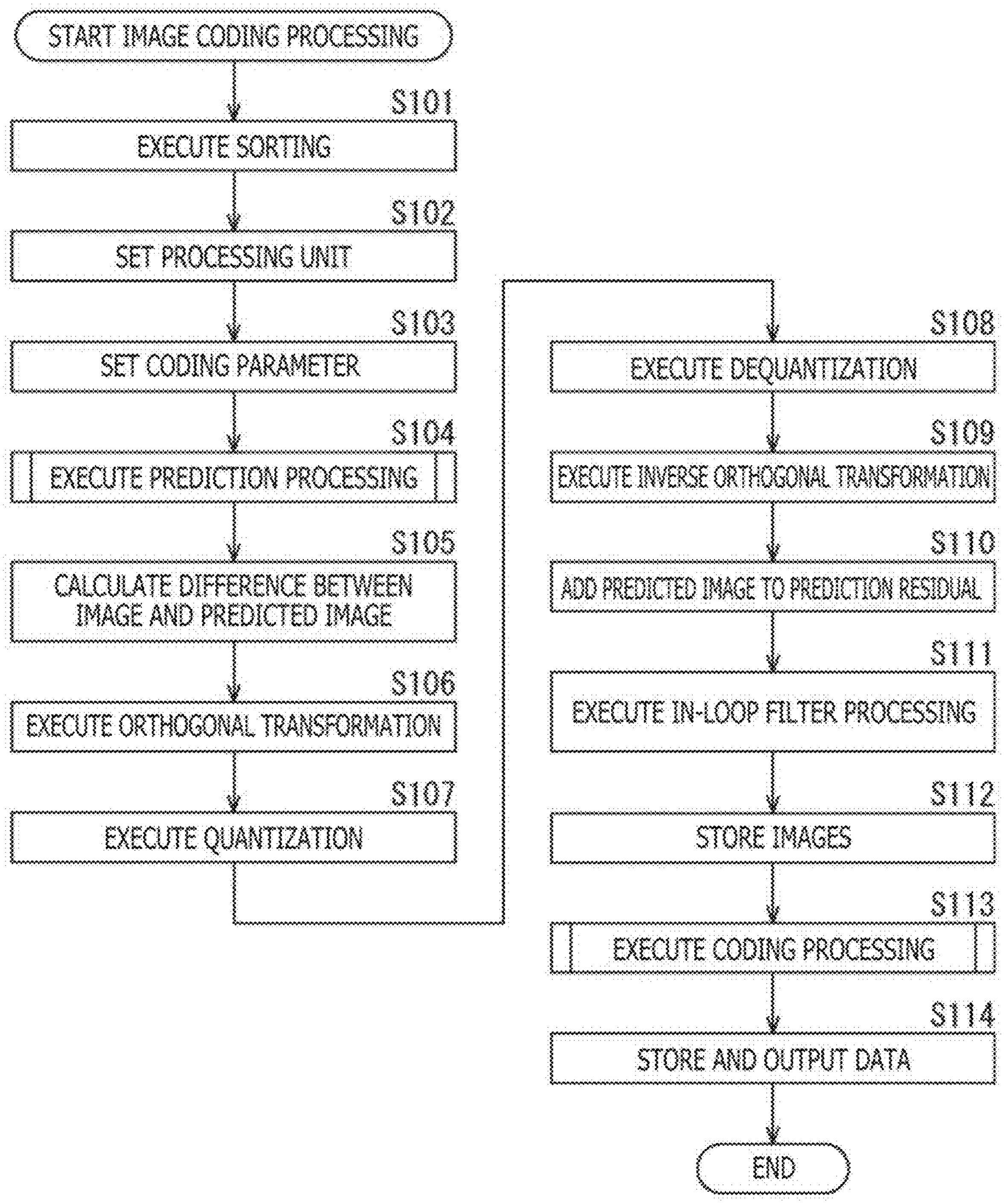
FIG. 14 is a flowchart illustrating an example of a flow of image coding processing.
Figure 15:
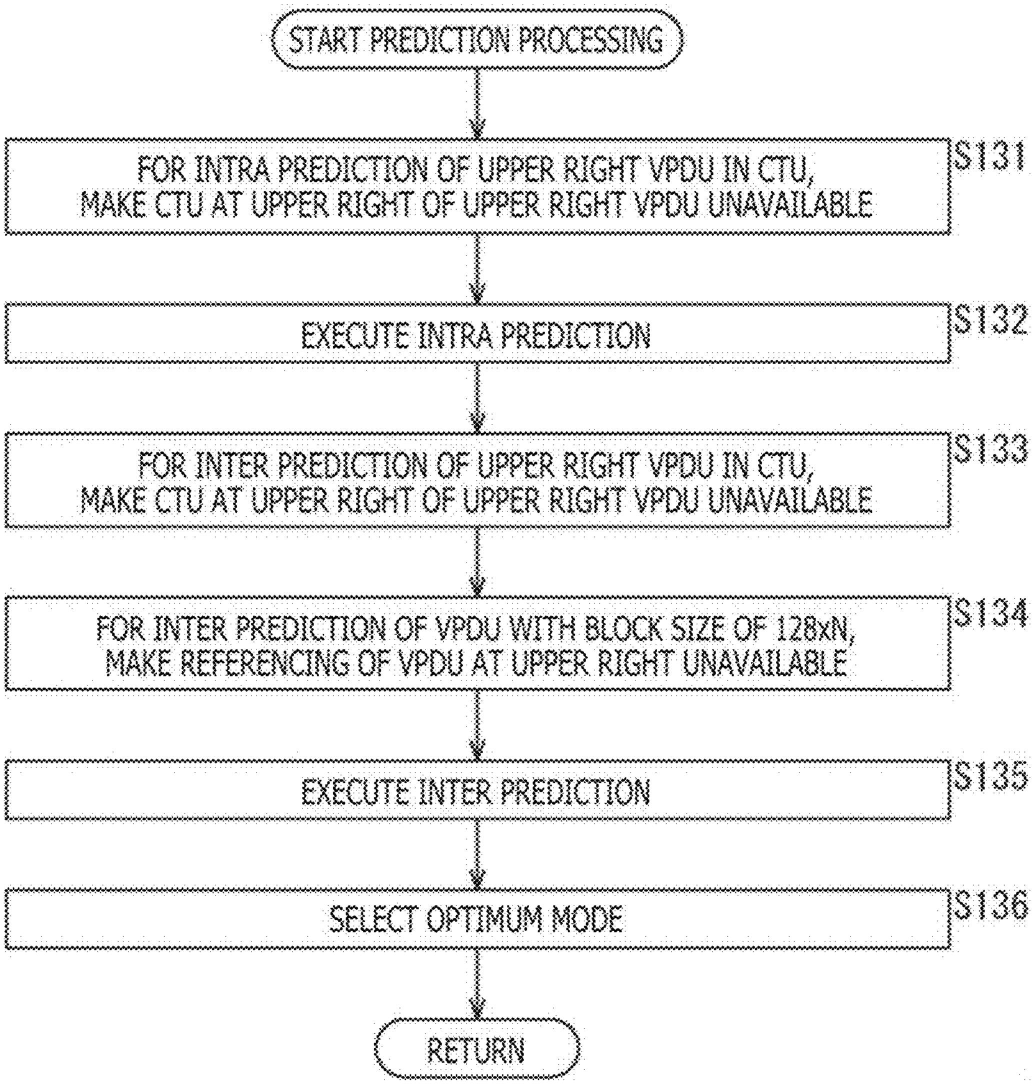
FIG. 15 is a flowchart illustrating an example of a flow of prediction processing.

When the processing in step S136 ends, the prediction processing ends, and the processing returns to FIG. 14.

<Flow of Coding Processing>

Figure 16:
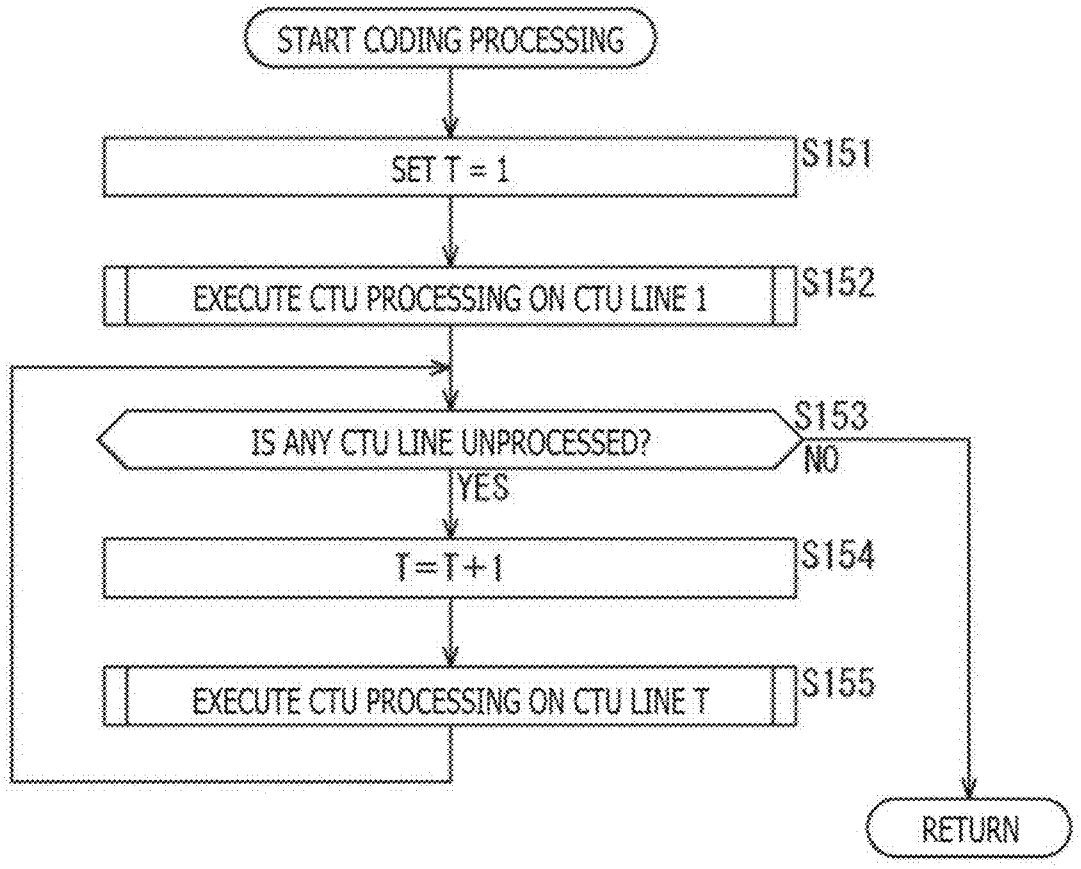
FIG. 16 is a flowchart illustrating an example of a flow of coding processing.

Next, an example of a flow of coding processing executed in step S113 in FIG. 14 will be described with reference to a flowchart in FIG. 16.

When the coding processing is started, in step S151, the coding section 515 sets, to an initial value (=1), a variable T indicating the position of the CTU line to be processed (a line number in order starting from the uppermost line in the image).

In step S152, the coding section 515 executes CTU processing on a CTU line 1 corresponding to the uppermost line in the image. The processing will be described below in detail. When the processing executed on the CTU line 1 ends, the processing proceeds to step S153.

In step S153, the coding section 515 determines whether or not there is any unprocessed CTU line. In a case where the processing has not been finished down to the lowermost CTU line and where the coding section 515 determines that there is an unprocessed CTU line, the processing proceeds to step S154.

In step S154, the coding section 515 adds 1 to the value of the variable T (T=T+1). When the value of the variable T is incremented, the processing proceeds to step S155.

In step S155, the coding section 515 executes CTU processing on a CTU line T corresponding to the T-th line from the uppermost line in the image. The processing will be described below in detail. When the processing executed on the CTU line T ends, the processing returns to step S153.

In other words, the processing in steps S153 to S155 is repeated until all the CTU lines are processed. Then, in a case where the coding section 515 determines, in step S153, that there is no unprocessed CTU line (all the CTU lines have been processed), the coding processing is ended, and the processing returns to FIG. 14.

<Flow of CTU Processing on CTU Line 1>

Figure 17:
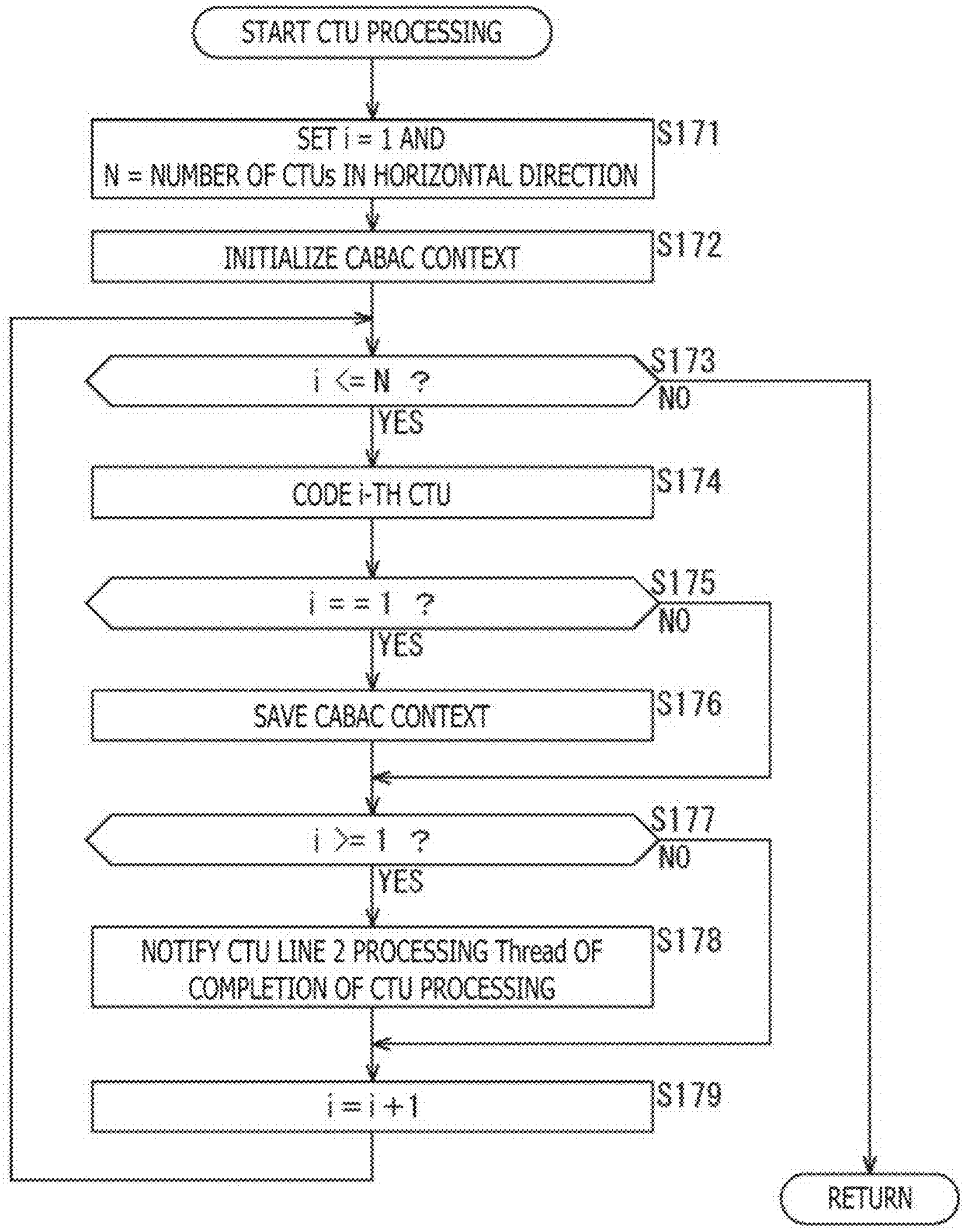
FIG. 17 is a flowchart illustrating an example of a flow of CTU processing.

Next, an example of a flow of the CTU processing on the CTU line 1 executed in step S152 in FIG. 16 will be described with reference to a flowchart in FIG. 17.

When the CTU processing is started, in step S171, the coding section 515 sets, to an initial value (=1), a variable i indicating the position of the current CTU (the number of CTUs from the leftmost CTU in the image). Additionally, the coding section 515 sets a value N to the number of CTUs in the horizontal direction. In other words, the value N indicates the number of CTUs in the CTU line 1.

In step S172, the coding section 515 initializes a CABAC context (occurrence probability).

In step S173, the coding section 515 determines whether or not the variable i is equal to or less than N (i<=N). In a case where the variable i is determined to be equal to or less than N and where the CTU line 1 is determined to include an unprocessed CTU, the processing proceeds to step S174.

In step S174, the coding section 515 codes the i-th CTU from the leftmost end. The coding section 515 codes the i-th CTU from the leftmost end for each of the VPDUs included in the i-th CTU. When the i-th CTU from the leftmost end is coded, the processing proceeds to step S175.

In step S175, the coding section 515 determines whether or not the variable i has a value of 1 (i==1). In a case where the value of the variable i is determined to be 1 (in other words, the leftmost CTU has been coded in the processing in step S174), the processing proceeds to step S176.

In step S176, the coding section 515 saves a CABAC context (occurrence probability) of the last VPDU in the leftmost CTU in the image, the CABAC context having been generated in step S174. When the context is saved, the processing proceeds to step S177.

Additionally, in step S175, in a case where the value of the variable i is determined not to be 2 (the leftmost CTU in the image is not the processing target), step S176 of processing is skipped, and the processing proceeds to step S177.

In step S177, the coding section 515 determines whether or not the value of the variable i is equal to or greater than 1 (i>=1). In a case where the value of the variable i is determined to be equal to or greater than 1, the processing proceeds to step S178.

In step S178, the coding section 515 notifies completion of the CTU processing to a CTU line 2 processing thread corresponding to a thread that processes a CTU line 2. When the completion of the CTU processing is notified, the processing proceeds to step S179.

Additionally, in a case where, in step S177, the value of the variable i is determined to be less than 1 (the leftmost CTU has not completely been coded), step S178 of processing is skipped, and the processing proceeds to step S179.

In step S179, the coding section 515 adds 1 to the value of the variable i (i=i+1). When the value of the variable i is incremented, the processing returns to step S173.

In other words, the processing in steps S173 to S179 is repeated until all the CTUs in the CTU line 1 are processed. Then, in step S173, in a case where the coding section 515 determines that there is no unprocessed CTU (all the CTUs in the CTU line 1 have been processed), the CTU processing ends, and the processing returns to FIG. 16.

<Flow of CTU Processing on CTU Line T>

Figure 18:
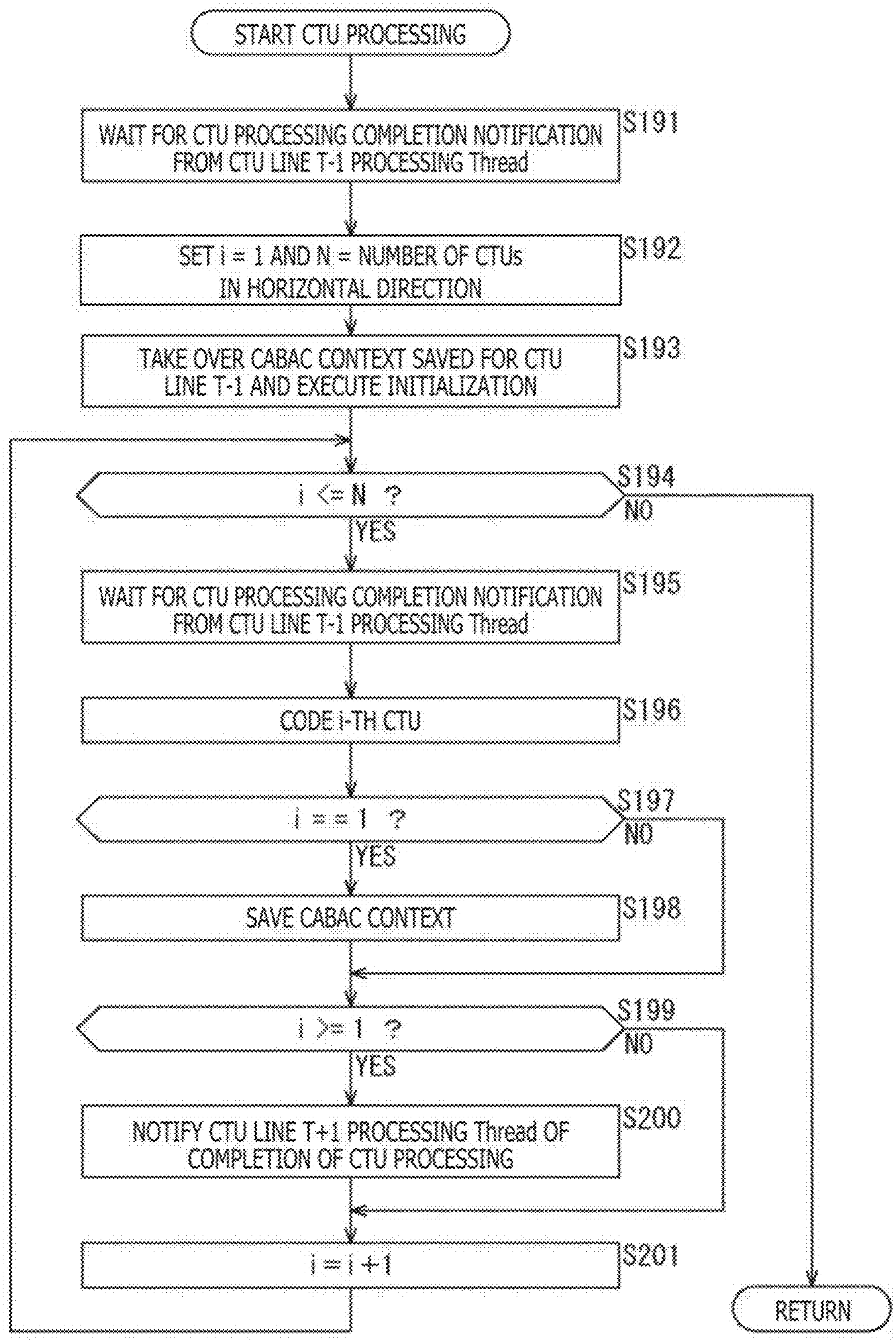
FIG. 18 is a flowchart illustrating an example of a flow of CTU processing.

Next, an example of a flow of CTU processing on a CTU line T executed in step S155 and the like in FIG. 16 will be described with reference to a flowchart in FIG. 18.

When the CTU processing is started, in step S191, the coding section 515 waits until the coding section 515 receives notification of completion of CTU processing from a CTU line T-1 processing thread corresponding to a thread that processes a CTU line T-1 immediately above the CTU line T. When the notification of completion of the CTU processing is acquired from the CTU line T-1 processing thread, the processing proceeds to step S192.

In step S192, the coding section 515 sets the variable i to the initial value (=1). Additionally, the coding section 515 sets the value N to the number of CTUs in the horizontal direction.

In step S193, the coding section 515 takes over a CABAC context (occurrence probability) saved when the CTU processing is executed on the CTU line T-1 immediately above the CTU line T, and initializes the CABAC.

In step S194, the coding section 515 determines whether or not the variable i is equal to or less than N (i<=N). In a case where the variable i is determined to be equal to or less than N and where the CTU line T is determined to include an unprocessed CTU, the processing proceeds to step S195.

In step S195, in order to control processing timings, the coding section 515 waits until the coding section 515 receives notification of completion of CTU processing from the CTU line T-1 processing thread. When the notification of completion of CTU processing is acquired from the CTU line T-1 processing thread, the processing proceeds to step S196.

In step S196, the coding section 515 codes the i-th CTU from the leftmost end for each of the VPDUs included in the i-th CTU. When the i-th CTU from the leftmost end is coded, the processing proceeds to step S197.

In step S197, the coding section 515 determines whether or not the value of the variable i is 1 (i==1). In a case where the value of the variable i is determined to be 1, that is, the leftmost CTU is determined to be processed, the processing proceeds to step S198.

In step S198, the coding section 515 saves a CABAC context (occurrence probability) of the last VPDU in the leftmost CTU in the image, the CABAC context having been generated in step S196. When the context is saved, the processing proceeds to step S199.

Additionally, in step S197, in a case where the value of the variable i is determined not to be 1 (the leftmost CTU in the image is not the processing target), step S198 of processing is skipped, and the processing proceeds to step S199.

In step S199, the coding section 515 determines whether or not the value of the variable i is equal to or greater than 1 (i>=1). In a case where the value of the variable i is determined to be equal to or greater than 1, the processing proceeds to step S200.

In step S200, the coding section 515 notifies completion of the CTU processing to a CTU line T+1 processing thread corresponding to a thread that processes a CTU line T+1 immediately below the CTU line T. When the completion of the CTU processing is notified, the processing proceeds to step S201.

Additionally, in a case where, in step S199, the value of the variable i is determined to be less than 1 (that is, the leftmost CTU has not completely been coded), step S200 of processing is skipped, and the processing proceeds to step S201.

In step S201, the coding section 515 adds 1 to the value of the variable i (i=i+1). When the value of the variable i is incremented, the processing returns to step S194.

In other words, the processing in steps S194 to S201 is repeated until all the CTUs in the CTU line T are processed. Then, in step S194, in a case where the coding section 515 determines that there is no unprocessed CTU (all the CTUs in the CTU line T have been processed), the CTU processing ends, and the processing returns to FIG. 16.

By executing each step of processing, the image coding apparatus 500 can suppress a decrease in the parallelism of coding.

<5-3: Image Decoding Apparatus>

Additionally, the present technique described above can be applied to, for example, an image decoding apparatus that decodes coded data obtained by coding image data.

Figure 19:
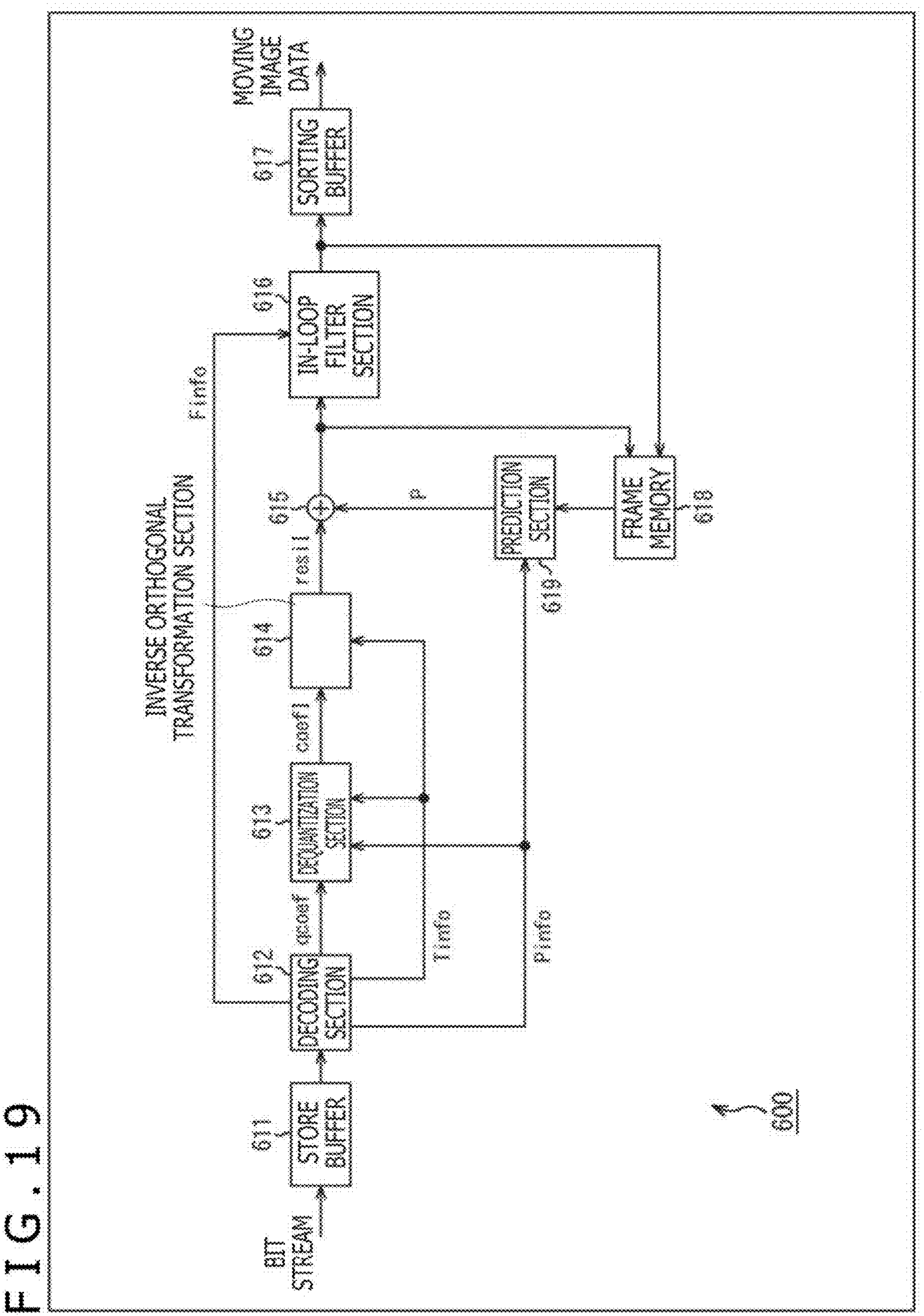
FIG. 19 is a block diagram illustrating a main configuration example of an image decoding apparatus.

FIG. 19 is a block diagram illustrating an example of a configuration of an image decoding apparatus corresponding to an aspect of the image processing apparatus to which the present technique is applied. An image decoding apparatus 600 illustrated in FIG. 25 decodes coded data obtained by coding a prediction residual between an image and a prediction image for the image, as in AVC or HEVC. For example, the image decoding apparatus 600 implements the techniques described in NPL 1 to NPL 6 and decodes coded data obtained by coding image data of moving images, by using a method complying with a standard described in any of these pieces of literature. For example, the image decoding apparatus 600 decodes coded data (bit stream) generated by the image coding apparatus 500 described above.

Note that FIG. 19 illustrates main elements such as processing sections and flows of data but does not illustrate all the elements of the image decoding apparatus 600. In other words, in the image decoding apparatus 600, processing sections not illustrated as blocks in FIG. 19 may be present, or flows of processing or data not illustrated as arrows or the like in FIG. 19 may be present.

In FIG. 19, the image decoding apparatus 600 includes a store buffer 611, a decoding section 612, a dequantization section 613, an inverse orthogonal transformation section 614, a calculation section 615, an in-loop filter section 616, a sorting buffer 617, a frame memory 618, and a prediction section 619. Note that the prediction section 619 includes an intra prediction section and an inter prediction section that are not illustrated. The image decoding apparatus 600 is an apparatus configured to generate moving image data by decoding coded data (bit stream).

<Store Buffer>

The store buffer 611 acquires and holds (stores) a bit stream input to the image decoding apparatus 600. The store buffer 611 feeds the stored bit stream to the decoding section 612, for example, at predetermined timings or in a case where a predetermined condition is satisfied.

<Decoding Section>

The decoding section 612 executes processing related to decoding of images. For example, the decoding section 612 receives, as an input, the bit stream fed from the store buffer 611, and variable-length-decodes syntax values of respective syntax elements from the bit sequence according to definitions in a syntax table, to derive parameters.

The parameters derived from the syntax elements and the syntax values of the syntax elements include, for example, the header information Hinfo, the prediction mode information Pinfo, the transformation information Tinfo, the residual information Rinfo, the filter information Finfo, and the like. In other words, the decoding section 612 parses (analyzes and acquires) these pieces of information from the bit stream. These pieces of information will be described below.

<Header Information Hinfo>

The header information Hinfo includes header information such as VPS (Video Parameter Set)/SPS (Sequence ParameterSet)/PPS (Picture Parameter Set)/SH (Slice Header). The header information Hinfo includes information specifying, for example, an image size (horizontal width PicWidth and vertical width PicHeight), a bit depth (luminance bitDepthY and color difference bitDepthC), a color difference array type ChromaArrayType, a maximum value of a CU size MaxCUSize/a minimum value of the CU size MinCUSize, a maximum depth MaxQTDepth/minimum depth MinQTDepth of a quad-tree splitting, a maximum depth MaxBTDepth/minimum depth MinBTDepth of a binary-tree splitting, a maximum value MaxTSSize of transformation skip blocks (also referred to as a maximum transformation skip block size), an on/off flag (also referred to as an enabled flag) for each coding tool, and the like.

For example, the on/off flags for coding tools included in the header information Hinfo include on/off flags related to transformation and quantization processing described below. Note that the on/off flag for a coding tool can also be interpreted as a flag indicating whether or not a syntax related to the coding tool is present in the coded data. Additionally, the on/off flag having a value of 1 (true) indicates that the coding tool is available, whereas the on/off flag having a value of 0 (false) indicates that the coding tool is unavailable. Note that the flag values may be inversely interpreted.

A cross-component prediction enabled flag (ccp_enabled_flag) is flag information indicating whether or not cross-component prediction (CCP, also referred to as CC prediction) is available. For example, the flag information being "1" (true) indicates that CCP is available, whereas the flag information being "0" (false) indicates that CCP is unavailable.

Note that the CCP is also referred to as cross-component linear prediction (CCLM or CCLMP).

<Prediction Mode Information Pinfo>

The prediction mode information Pinfo includes information such as processing target PB (prediction block) size information PBSize (prediction block size), intra prediction mode information IPinfo, and motion prediction information MVinfo.

The intra prediction mode information IPinfo includes, for example, prev_intra_luma_pred_flag, mpm_idx, and rem_intra_pred_mode in JCTVC-W1005, 7.3.8.5 Coding Unit syntax and a luminance intra prediction mode IntraPredModeY derived from the syntax.

Additionally, the intra prediction mode information IPinfo includes, for example, a cross-component prediction flag (ccp_flag (cclmp_flag)), a multiclass linear prediction mode flag (mclm_flag), a color difference sample location type identifier (chroma_sample_loc_type_idx), a color difference MPM identifier (chroma_mpm_idx), and a luminance intra prediction mode (IntraPredModeC) derived from these syntaxes.

The cross-component prediction flag (ccp_flag (cclmp_flag)) is flag information indicating whether or not to apply cross-component linear prediction. For example, ccp_flag==1 indicates that cross-component linear prediction is to be applied, and ccp_flag==0 indicates that cross-component prediction flag is not to be applied.

The multiclass linear prediction mode flag (mclm_flag) is information related to the mode of linear prediction (linear prediction mode information). More specifically, the multiclass linear prediction mode flag (mclm_flag) is flag information indicating whether or not to apply a multiclass linear prediction mode. For example, "0" indicates a one-class mode (single class mode) (for example, CCLMP), and "1" indicates a two-class mode (multiclass mode) (for example, MCLMP).

The color difference sample location type identifier (chroma_sample_loc_type_idx) is an identifier that identifies the type of the pixel location of a color difference component (also referred to as a color difference sample location type). For example, in a case where a color difference array type (ChromaArrayType) corresponding to information related to a color format indicates a 420 format, the color difference sample location type identifier is assigned as indicated by the Equation (4) below.

[Math. 4]

$$\begin{aligned} \text{chroma\_sample\_loc\_type\_idx} = 0&: Type2 \\ \text{chroma\_sample\_loc\_type\_idx} = 1&: Type3 \\ \text{chroma\_sample\_loc\_type\_idx} = 2&: Type0 \\ \text{chroma\_sample\_loc\_type\_idx} = 3&: Type1 \end{aligned} \tag{4}$$

Note that the color difference sample location type identifier (chroma_sample_loc_type_idx) is (stored in and) transmitted as information related to the pixel location of the color difference component (chroma_sample_loc_info( )).

The color difference MPM identifier (chroma_mpm_idx) is an identifier that represents which prediction mode candidate in a color difference intra prediction candidate list (intraPredModeCandListC) is to be specified as a color difference intra prediction mode.

The motion prediction information MVinfo includes, for example, information such as merge_idx, merge_flag, inter pred_idc, ref_idx LX, mvp_lX_flag, X={0,1}, and mvd (see, for example, JCTVC-W1005, 7.3.8.6 Prediction Unit Syntax).

Needless to say, information included in the prediction mode information Pinfo is optional, and information other than that described above may be included.

<Transformation Information Tinfo>

The transformation information Tinfo includes, for example, information described below. Needless to say, information included in the transformation information Tinfo is optional, and information other than the following may be included.

The horizontal width size TBWSize and vertical width TBHSize of a transformation block to be processed (or logarithmic values log 2TBWSize and log 2TBHSize of the TBWSize and TBHSize to base 2). Transformation skip flag (ts_flag): a flag indicating whether or not to skip (inverse) primary transformation and (inverse) secondary transformation.

Scan Identifier (scanIdx)

Quantization Parameter (Qp)

Quantization matrix (scaling_matrix (for example, JCTVC-W1005, 7.3.4 Scaling list data syntax))

<Residual Information Rinfo>

The residual information Rinfo (see, for example, 7.3.8.11 Residual Coding syntax in JCTVC-W1005) includes, for example, the following syntaxes.

cbf (coded_block_flag): residual data presence/absence flag last_sig_coeff_x_pos: last non-zero coefficient X coordinate last_sig_coeff_y_pos: last non-zero coefficient Y coordinate coded_sub_block_flag: subblock non-zero coefficient presence/absence flag sig_coeff_flag: non-zero coefficient presence/absence flag gr1_flag: a flag indicating whether the level of a non-zero coefficient is greater than 1 (also referred to as a GR1 flag)

gr2_flag: a flag indicating whether the level of the non-zero coefficient is greater than 2 (also referred to as a GR2 flag)

sign_flag: code indicating whether the non-zero coefficient is positive or negative (also referred to as sign code)

coeff_abs_level_remaining: the remaining level of the non-zero coefficient (also referred to as a non-zero coefficient remaining level) etc.

Needless to say, information included in the residual information Rinfo is optional, and information other than that described above may be included.

<Filter Information Finfo>

The filter information Finfo includes, for example, control information related to respective types of filter processing described below.

Control information related to a deblocking filter (DBF)

Control information related to an adaptive offset filter (SAO)

Control information related to an adaptive loop filter (ALF)

Control information related to any other linear or nonlinear filter

More specifically, the filter information Finfo includes, for example, pictures to which each filter is applied, information specifying regions within a picture, filter on/off control information in CU units, slices, filter on/off control information related to boundaries between tiles, and the like. Needless to say, information included in the filter information Finfo is optional, and information other than that described above may be included.

Returning to the description of the decoding section 612, the decoding section 612 derives the quantization transformation coefficient level qcoef in each coefficient position within each transformation block with reference to the residual information Rinfo. The decoding section 612 feeds the quantization transformation coefficient level qcoef to the dequantization section 613.

Additionally, the decoding section 612 feeds each block with the header information Hinfo, prediction mode information Pinfo, quantization transformation coefficient level qcoef, transformation information Tinfo, and filter information Finfo that have been parsed. Specifically, the information is fed as described below.

The header information Hinfo is fed to the dequantization section 613, the inverse orthogonal transformation section 614, the prediction section 619, and the in-loop filter section 616. The prediction mode information Pinfo is fed to the dequantization section 613 and the prediction section 619. The transformation information Tinfo is fed to the dequantization section 613 and the inverse orthogonal transformation section 614. The filter information Finfo is fed to the in-loop filter section 616.

Needless to say, the above-described example is illustrative and not restrictive. For example, each of the coding parameters may be fed to any processing section. Additionally, other information may be fed to any processing section.

<Dequantization Section>

The dequantization section 613 executes processing related to dequantization. For example, the dequantization section 613 receives, as inputs, the transformation information Tinfo and the quantization transformation coefficient level qcoef that are fed from the decoding section 612, and scales (dequantizes) the value of the quantization transformation coefficient level qcoef on the basis of the transformation information Tinfo, thereby deriving a dequantized transformation coefficient coefI.

Note that the dequantization is executed as inverse processing of the quantization executed by the quantization section 514. Additionally, the dequantization is processing similar to the dequantization executed by the dequantization section 517. In other words, the dequantization section 517 executes processing (dequantization) similar to the processing executed by the dequantization section 613.

The dequantization section 613 feeds the derived transformation coefficient coefI to the inverse orthogonal transformation section 614.

<Inverse Orthogonal Transformation Section>

The inverse orthogonal transformation section 614 executes processing related to inverse orthogonal transformation. For example, the inverse orthogonal transformation section 614 receives, as inputs, the transformation coefficient coefI fed from the dequantization section 613 and the transformation information Tinfo fed from the decoding section 612, and executes inverse orthogonal transformation on the transformation coefficient coefI on the basis of the transformation information Tinfo, thereby deriving prediction residual resiI.

Note that the inverse orthogonal transformation is executed as inverse processing of the orthogonal transformation executed by the orthogonal transformation section 513. Additionally, the inverse orthogonal transformation is processing similar to the inverse orthogonal transformation executed by the inverse orthogonal transformation section 518. In other words, the inverse orthogonal transformation section 518 executes processing (inverse orthogonal transformation) similar to the processing executed by the inverse orthogonal transformation section 614.

The inverse orthogonal transformation section 614 feeds the derived prediction residual resiI to the calculation section 615.

<Calculation Section>

The calculation section 615 executes processing related to addition of information regarding an image. For example, the calculation section 615 receives, as inputs, the prediction residual resiI fed from the inverse orthogonal transformation section 614 and the prediction image P fed from the prediction section 619. The calculation section 615 adds the prediction residual resiI and the prediction image P (prediction signal) corresponding to the prediction residual resiI to derive a local decoded image Rlocal, as indicated by the Equation (5) below.

[Math. 5]

$$Rlocal = resiI + P \quad (5)$$

The calculation section 615 feeds the derived local decoded image Rlocal to the in-loop filter section 616 and the frame memory 618.

<In-Loop Filter Section>

The in-loop filter section 616 executes processing related to in-loop filter processing. For example, the in-loop filter section 616 receives, as inputs, the local decoded image Rlocal fed from the calculation section 615 and the filter information Finfo fed from the decoding section 612. Note that information input to the in-loop filter section 616 is optional and that information other than that described above may be input.

The in-loop filter section 616 executes filter processing on the local decoded image Rlocal as appropriate on the basis of the filter information Finfo.

For example, the in-loop filter section 616 applies four in-loop filters including a bilateral filter, a deblocking filter (DBF), an adaptive offset filter (SAO (Sample Adaptive Offset)), and an adaptive loop filter (ALF) in this order. Note that which filter is applied and in which order the filters are applied are optional and can be determined through appropriate selection.

The in-loop filter section 616 executes filter processing corresponding to the filter processing executed on the coding side (for example, the in-loop filter section 520 of the image coding apparatus 500). Needless to say, the filter processing executed by the in-loop filter section 616 is optional and is not limited to the above-described example. For example, the in-loop filter section 616 may apply a Wiener filter or the like.

The in-loop filter section 616 feeds the filtered local decoded image Rlocal to the sorting buffer 617 and the frame memory 618.

<Sorting Buffer>

The sorting buffer 617 receives, as an input, the local decoded image Rlocal fed from the in-loop filter section 616 and holds (stores) the local decoded image Rlocal. The sorting buffer 617 uses the local decoded image Rlocal to reconstruct decoded images R in picture units and holds the decoded images R (stores the decoded image R in the buffer). The sorting buffer 617 sorts the obtained decoded images R to change the order of the decoded images R from the order of decoding to the order of reproduction. The sorting buffer 617 outputs the group of sorted decoded images R to the outside of the image decoding apparatus 600 as moving image data.

<Frame Memory>

The frame memory 618 executes processing related to storage of data regarding an image. For example, the frame memory 618 receives, as an input, the local decoded image Rlocal fed from the calculation section 615, reconstructs decoded images R in picture units, and stores the decoded images R in the buffer in the frame memory 618.

Additionally, the frame memory 618 receives, as an input, the local decoded image Rlocal subjected to in-loop filtering and fed from the in-loop filter section 616, reconstructs decoded images R in picture units, and stores the decoded images R in the buffer in the frame memory 618. The frame memory 618 feeds any of the decoded images R stored in the frame memory 618 (or a part of the decoded image R) to the prediction section 619 as a reference image, as appropriate.

Note that the frame memory 618 may store the header information Hinfo, the prediction mode information Pinfo, the transformation information Tinfo, the filter information Finfo, and the like which are related to generation of decoded images.

<Prediction Section>

The prediction section 619 executes processing related to generation of a prediction image. For example, the prediction section 619 receives, as an input, the prediction mode information Pinfo fed from the decoding section 612 and performs prediction by using a prediction method specified by the prediction mode information Pinfo, thus deriving a prediction image P. During the derivation, the prediction section 619 uses, as a reference image, the filtered or unfiltered decoded images R (or a part of the decoded images R) stored in the frame memory 618 and specified by the prediction mode information Pinfo. The prediction section 619 feeds the derived prediction image P to the calculation section 615.

<Application of the Present Technique>

The present technique described above in <3. Concepts> and <4. Method 1> is applied to the image decoding apparatus 600 configured as described above. For example, the "method 1-1" is applied to the image decoding apparatus 600. For example, the decoding section 612 may set VPDUs 121 in the CTU 111 and decode coded data in parallel in each line of the CTUs 111 including the VPDUs 121. Additionally, the decoding section 612 may perform processing of each CTU line so as to delay the processing by an amount corresponding to one CTU with respect to a CTU line immediately above the CTU line.

For example, the decoding section 612 may decode coded data obtained by coding coefficient data related to an image, in parallel in each line of coding tree units each including a single or a plurality of transformation blocks and corresponding to the topmost coding block in the tree structure, and may perform decoding of each line so as to delay the decoding by an amount corresponding to one coding tree unit with respect to decoding of a line immediately above the line.

Additionally, for example, the decoding section 612 may decode the coded data in each line of coding tree units of the coefficient data related to the image such that the coding tree units are sequentially decoded one by one from the leftmost coding tree unit.

In addition, for example, the decoding section 612 may decode the coded data of each coding tree unit for each of the transformation blocks.

Additionally, for example, the decoding section 612 may entropy-decode the coded data of each transformation block by using an occurrence probability derived from entropy decoding of the coded data of a preceding transformation block.

In addition, for example, the decoding section 612 may use an initial value of the occurrence probability to entropy-decode the coded data of the first transformation block in the leftmost coding tree unit in the uppermost line of coding tree units in the image. Additionally, for example, the decoding section 612 may entropy-decode the coded data of the first transformation block in each of the leftmost coding tree units in the second uppermost and subsequent lines of coding tree units in the image, by using an occurrence probability derived from entropy decoding of the coded data of the last transformation block in the leftmost coding tree unit in a line of coding tree units immediately above the line.

Additionally, the "method 1-2" may be applied to the image decoding apparatus 600. Specifically, the prediction section 619 may restrict some modes in the intra prediction. For example, the "method 1-2-1" may be applied to the image decoding apparatus 600. Specifically, in the intra prediction of an upper right VPDU in a CTU, the prediction section 619 may perform the intra prediction while referencing of a VPDU at the upper right of the upper right VPDU is made unavailable.

For example, in the intra prediction of an upper right transformation block in a coding tree unit, the prediction section 619 may make referencing of a transformation block at the upper right of the upper right transformation block unavailable.

Additionally, the "method 1-3" may be applied to the image decoding apparatus 600. Specifically, the prediction section 619 may restrict the inter prediction. For example, the "method 1-3-1" may be applied to the image decoding apparatus 600. Specifically, in the inter prediction in which an upper right VPDU in a CTU is used as the current prediction block, the prediction section 619 may perform the inter prediction while referencing of the inter prediction mode and motion vector of a VPDU at the upper right of the upper right VPDU is made unavailable.

For example, in the inter prediction of an upper right transformation block in a coding tree unit, the prediction section 619 may make referencing of a transformation block at the upper right of the upper right transformation block unavailable.

Additionally, for example, the "method 1-3-2" may be applied to the image decoding apparatus 600. Specifically, in the inter prediction of a prediction block with a block size of 128×N, the prediction section 619 may perform the inter prediction while referencing of the inter prediction mode and motion vector of a block at the upper right of the prediction block is made unavailable.

For example, in the inter prediction of a prediction block corresponding to a processing unit of the inter prediction and having the same horizontal length as that of the coding tree unit, the prediction section 619 may make referencing of a transformation block at the upper right of the prediction block unavailable.

Such a configuration enables the image decoding apparatus 600 to suppress a decrease in the parallelism of decoding, allowing suppression of an increase in processing time.

<5-4: Flow of Processing>

<Flow of Image Decoding Processing>

Next, a flow of each type of processing executed by the image decoding apparatus 600 as described above will be described below. First, an example of a flow of image decoding processing will be described with reference to a flowchart in FIG. 20.

When the image decoding processing is started, in step S301, the store buffer 611 acquires coded data (bit stream) fed from the outside of the image decoding apparatus 600 and holds (stores) the coded data.

In step S302, the decoding section 612 executes decoding processing to decode the coded data (bit stream), obtaining a quantization transformation coefficient level qcoef. Additionally, the decoding section 612 executes the decoding to parse (analyze and acquire) various types of coding parameters from the coded data (bit stream). The details of the decoding processing will be described below.

In step S303, the dequantization section 613 executes dequantization corresponding to the inverse processing of the quantization executed on the coding side, on the quantization transformation coefficient level qcoef obtained by the processing in step S302, thus obtaining a transformation coefficient coefI.

In step S304, the inverse orthogonal transformation section 614 executes inverse orthogonal transformation processing corresponding to the inverse processing of the orthogonal transformation processing executed on the coding side, on the transformation coefficient coefI obtained by the processing in step S303, thus obtaining a prediction residual resiI.

In step S305, the prediction section 619 executes prediction processing by using a prediction method specified by the coding side, on the basis of the information parsed in step S302, and generates a prediction image P by, for example, referencing the reference image stored in the frame memory 618.

In step S306, the calculation section 615 adds the prediction residual resiI obtained by the processing in step S304 and the prediction image P obtained by the processing in step S305, to derive a local decoded image Rlocal.

In step S307, the in-loop filter section 616 executes in-loop filter processing on the local decoded image Rlocal obtained by the processing in step S306.

Additionally, in step S308, the frame memory 618 stores at least either the local decoded image Rlocal obtained by the processing in step S306 or the filtered local decoded image Rlocal obtained by the processing in step S307.

In step S309, the sorting buffer 617 uses the filtered local decoded image Rlocal obtained by the processing in step S307 to derive decoded images R, and sorts the group of decoded images R to change the order of the decoded images R from the order of decoding to the order of reproduction.

In step S310, the sorting buffer 617 outputs the group of decoded images R sorted into the order of reproduction, to the outside of the image decoding apparatus 600 as moving images. When the processing in step S310 ends, the image decoding processing ends.

In the decoding processing executed in step S302 of the image decoding processing as described above, the decoding section 612 decodes coded data obtained by coding coefficient data related to an image, in parallel in each line of coding tree units each including a single or a plurality of transformation blocks and corresponding to the topmost coding block in the tree structure, and performs decoding of each line so as to delay the decoding by an amount corresponding to one coding tree unit with respect to decoding of a line immediately above the line. This enables the image decoding apparatus 600 to suppress a decrease in the parallelism of decoding, allowing suppression of an increase in processing time.

<Flow of Decoding Processing>

Figure 20:
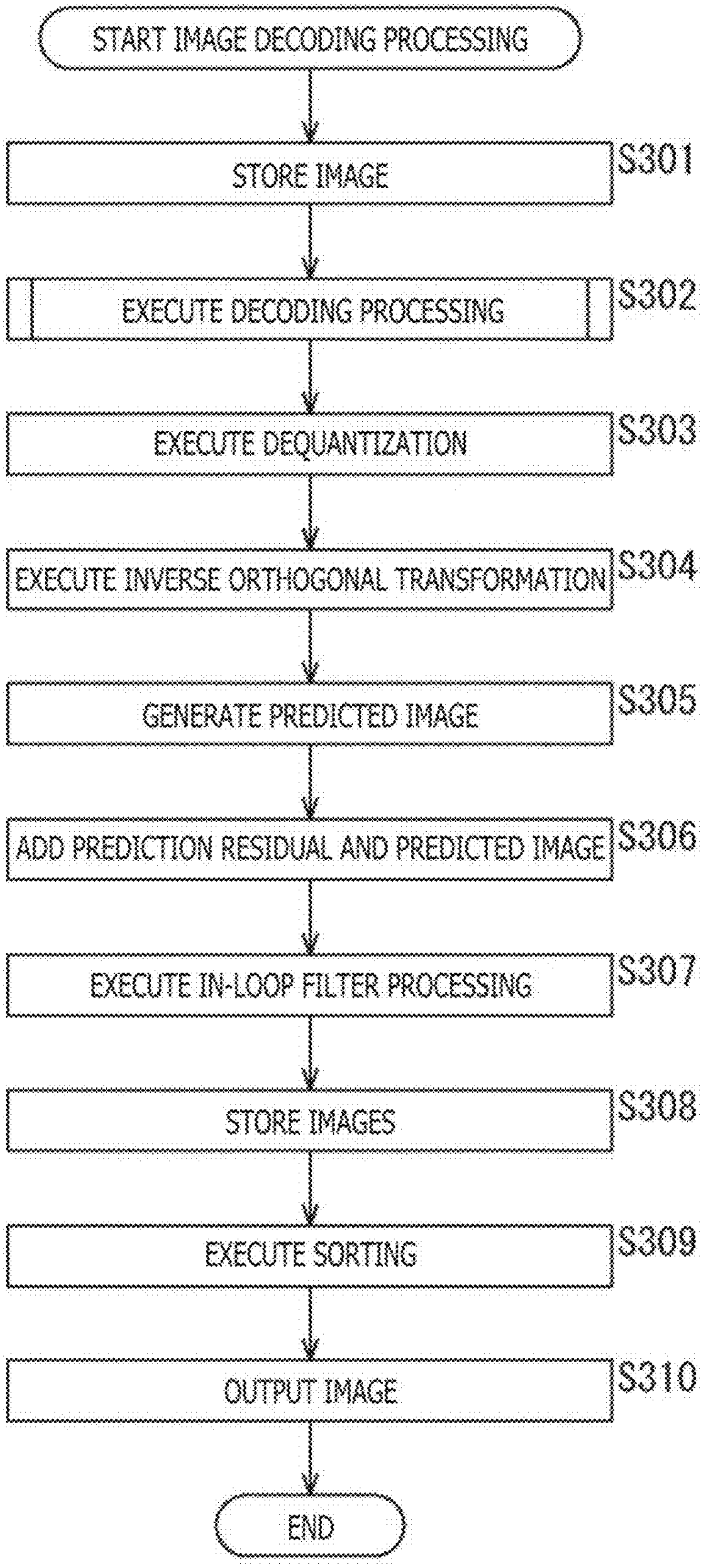
FIG. 20 is a flowchart illustrating an example of a flow of image decoding processing.
Figure 21:
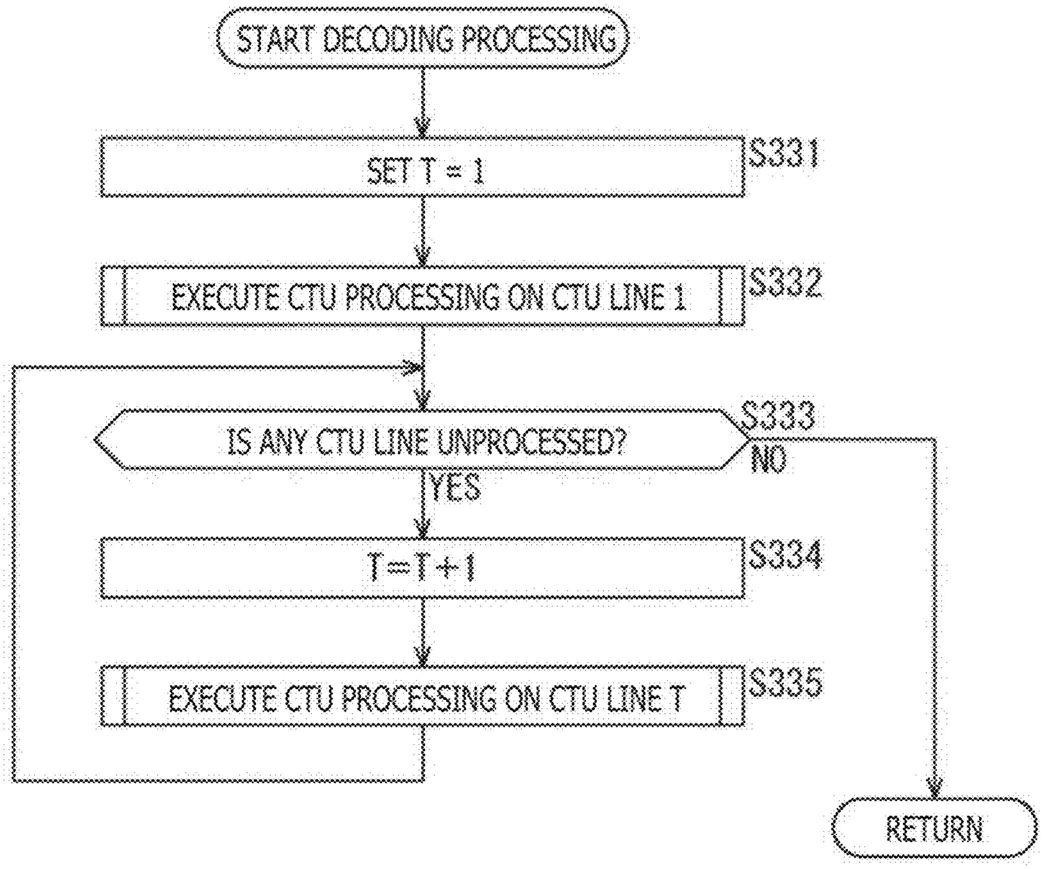
FIG. 21 is a flowchart illustrating an example of a flow of decoding processing.

Next, an example of a flow of decoding processing executed in step S302 in FIG. 20 will be described with reference to a flowchart in FIG. 21.

When the decoding processing is started, in step S331, the decoding section 612 sets, to an initial value (=1), the variable T indicating the position of the CTU line to be processed (a line number in order starting from the uppermost line in the image).

In step S332, the decoding section 612 executes CTU processing on the CTU line 1 corresponding to the uppermost line in the image. The details of the processing will be described below. When the processing on the CTU line 1 ends, the processing proceeds to step S333.

In step S333, the decoding section 612 determines whether or not there is any unprocessed CTU line. In a case where the decoding section 612 determines that the processing has not been executed down to the lowermost CTU line and that there is an unprocessed CTU line, the processing proceeds to step S334.

In step S334, the decoding section 612 adds 1 to the value of the variable T (T=T+1). When the value of the variable T is incremented, the processing proceeds to step S335.

In step S335, the decoding section 612 executes CTU processing on a CTU line T corresponding to the T-th line from the uppermost line in the image. The details of the processing will be described below. When the processing on the CTU line T ends, the processing returns to step S333.

In other words, the processing in steps S333 to S335 is repeated until all the CTU lines are processed. Then, in step S333, in a case where the decoding section 612 determines that there is no unprocessed CTU line (all the CTU lines have been processed), the decoding processing ends, and the processing returns to FIG. 20.

<Flow of VPDU Processing on CTU Line 1>

Figure 22:
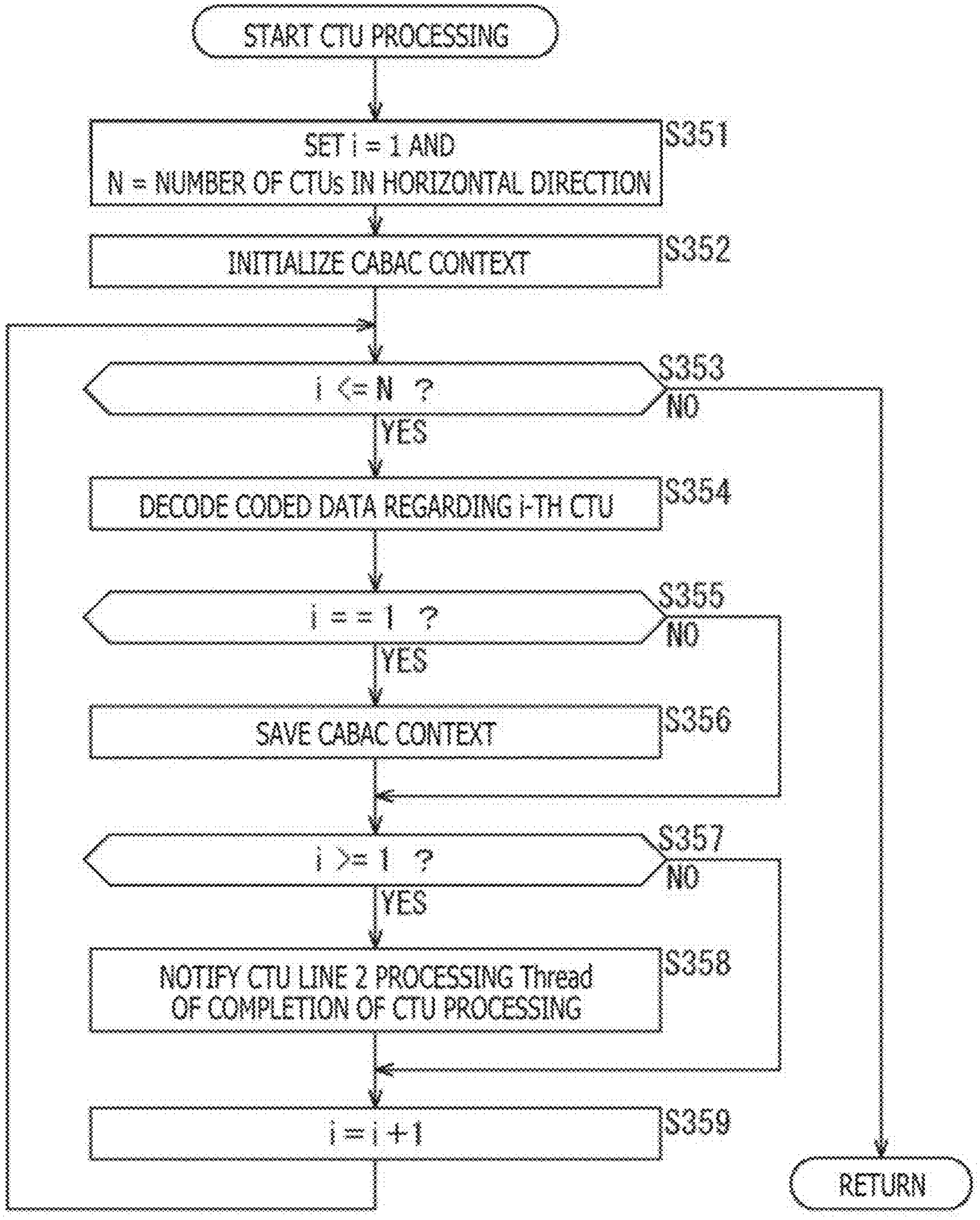
FIG. 22 is a flowchart illustrating an example of a flow of CTU processing.

Next, an example of a flow of the CTU processing on the CTU line 1 executed in step S332 in FIG. 21 will be described With reference to a flowchart in FIG. 22.

When the CTU processing is started, in step S351, the decoding section 612 sets, to an initial value (=1), the variable i indicating the position of the current CTU (a CTU number in order starting from the leftmost CTU in the image). Additionally, the decoding section 612 sets the value N to the number of CTUs in the horizontal direction.

In step S352, the decoding section 612 initializes the CABAC context (occurrence probability).

In step S353, the decoding section 612 determines whether or not the variable i is equal to or less than N (i<=N). In a case where the decoding section 612 determines that the variable i is equal to or less than N and that the CTU line 1 includes an unprocessed CTU, the processing proceeds to step S354.

In step S354, the decoding section 612 decodes the coded data of the i-th CTU from the leftmost end.

In step S355, the decoding section 612 determines whether or not the value of the variable i is 1 (i==1). In a case where the value of the variable i is determined to be 1 (that is, in step S354, the leftmost CTU in the image is processed), the processing proceeds to step S356.

In step S356, the decoding section 612 saves a CABAC context (occurrence probability) of the last VPDU in the leftmost CTU in the image, the CABAC context having been generated in step S354. When the context is saved, the processing proceeds to step S357.

Additionally, in step S355, in a case where the value of the variable i is determined not to be 1 (in step S354, a CTU other than the leftmost CTU in the image is processed or the processing of the leftmost CTU in the image has not been finished), step S356 of processing is skipped, and the processing proceeds to step S357.

In step S357, the decoding section 612 determines whether or not the value of the variable i is equal to or greater than 1 (i>=1). In a case where the value of the variable i is determined to be equal to or greater than 1, the processing proceeds to step S358.

In step S358, the decoding section 612 notifies completion of the CTU processing to the CTU line 2 processing thread corresponding to a thread that processes the CTU line 2. When the completion of the CTU processing is notified, the processing proceeds to step S359.

Additionally, in step S357, in a case where the value of the variable i is determined to be less than 1 (the processing of the leftmost CTU has not been finished), step S358 of processing is skipped, and the processing proceeds to step S359.

In step S359, the decoding section 612 adds 1 to the value of the variable i (i=i+1). When the value of the variable i is incremented, the processing returns to step S353.

In other words, the processing in steps S353 to S359 is repeated until all the CTUs in the CTU line 1 are processed. Then, in step S353, in a case where the decoding section 612 determines that there is no unprocessed CTU (all the CTUs in the CTU line 1 have been processed), the CTU processing ends, and the processing returns to FIG. 21.

<Flow of CTU Processing on CTU Line T>

Next, an example of a flow of CTU processing on the CTU line T executed in step S335 in FIG. 21 will be described with reference to flowcharts in FIG. 23 and FIG. 24.

When the CTU processing in such a case is started, in step S371, the decoding section 612 waits until the decoding section 612 receives notification of completion of CTU processing from the CTU line T-1 processing thread corresponding to a thread that processes the CTU line T-1 immediately above the CTU line T. When the notification of completion of the CTU processing is received from the CTU line T-1 processing thread, the processing proceeds to step S372.

In step S372, the decoding section 612 sets the variable i to the initial value (=1). Additionally, the decoding section 612 sets the value N to the number of CTUs in the horizontal direction.

In step S373, the decoding section 612 takes over a CABAC context (occurrence probability) saved when the CTU processing is executed on the CTU line T-1 immediately above the CTU line T, and initializes the CABAC.

In step S374, the decoding section 612 determines whether or not the variable i is equal to or less than N (i<=N). In a case where the decoding section 612 determines that the variable i is equal to or less than N and that the CTU line T includes an unprocessed CTU, the processing proceeds to step S375.

In step S375, in order to control processing timings, the decoding section 612 waits until the decoding section 612 receives notification of completion of CTU processing from the CTU line T-1 processing thread. When the notification of completion of CTU processing is received from the CTU line T-1 processing thread, the processing proceeds to step S376.

In step S376, the decoding section 612 makes referencing of a CTU at the upper right of the current CTU unavailable. Accordingly, in a case where the prediction processing (step S305 in FIG. 20) includes the inter prediction in which the upper right VPDU in the CTU is used as the current prediction block, the prediction section 619 can perform the inter prediction while referencing of the inter prediction mode and motion vector of a VPDU at the upper right of the current prediction block (that is, a CTU at the upper right of the current CTU) is made unavailable.

In step S377, the decoding section 612 decodes the coded data of the i-th CTU from the leftmost end. When the decoding ends, the processing proceeds to step S381 in FIG. 24.

In step S381, the decoding section 612 determines whether or not the i-th CTU is in an Inter128×N mode (that is, whether or not the i-th CTU is included in the prediction block of 128×N in which the inter prediction has been performed). In a case where the decoding section 612 determines that the i-th CTU is in the Inter128×N mode, the processing proceeds to step S382.

In step S382, in such a case, the current CTU is included in the prediction block with a block size of 128×N in which the inter prediction has been performed, and thus, the decoding section 612 makes referencing of a block at the upper right of the prediction block unavailable. When the processing in step S382 ends, the processing proceeds to step S383.

Additionally, in step S381, in a case where the i-th CTU is determined not to be in the Inter128×N mode, step S382 of processing is skipped (omitted), and the processing proceeds to step S383.

In step S383, the decoding section 612 determines whether or not the value of the variable i is 1 (i==1). In a case where the value of the variable i is determined to be 1, the processing proceeds to step S384.

Figure 23:
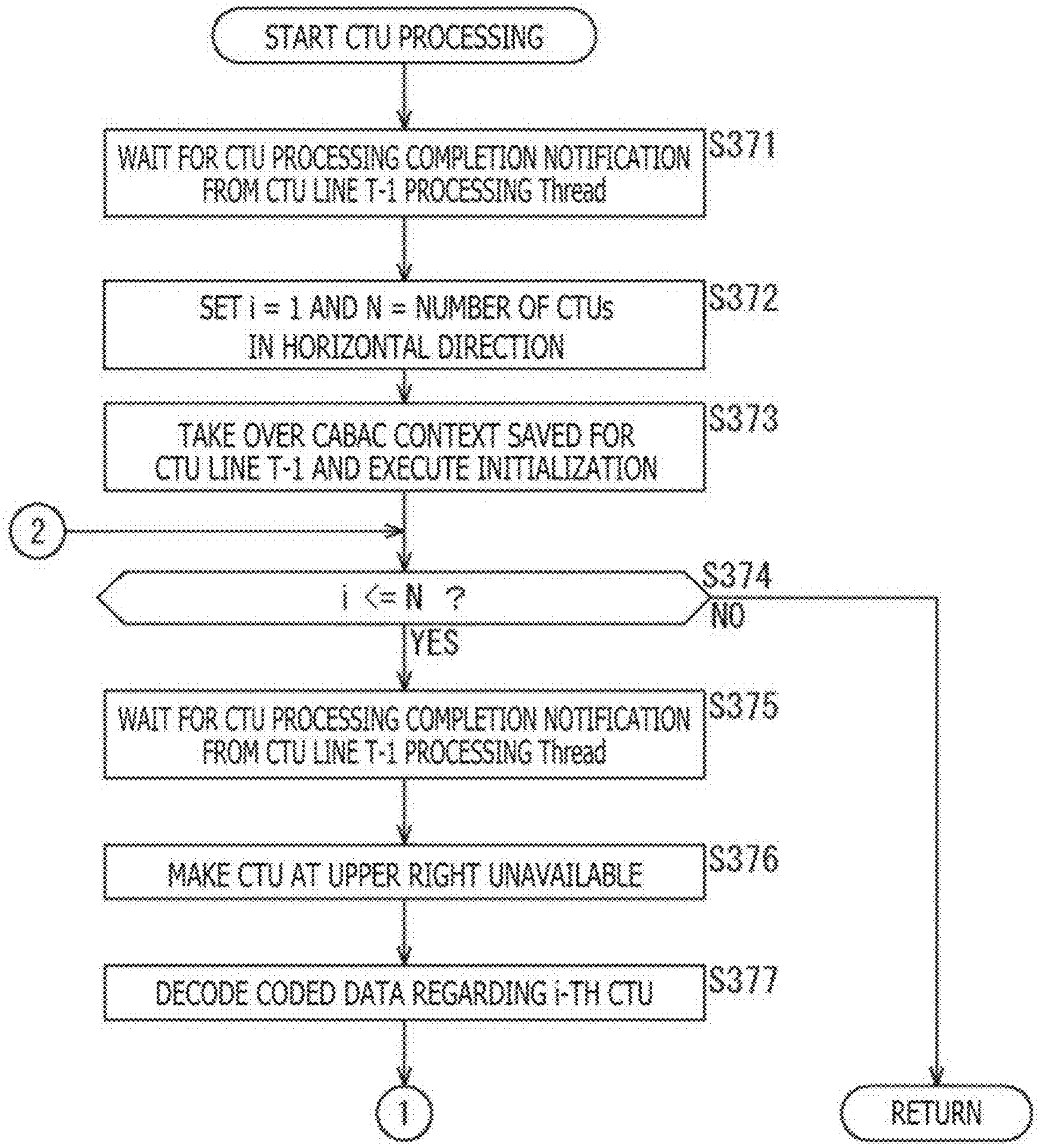
FIG. 23 is a flowchart illustrating an example of a flow of CTU processing.

In step S384, the decoding section 612 saves the CABAC context (occurrence probability) of the current VPDU (last VPDU in the leftmost CTU in the image), the CABAC coding having been generated in step S377 in FIG. 23. When the context is saved, the processing proceeds to step S385.

Additionally, in step S383, in a case where the value of the variable i is determined not to be 1 (the leftmost CTU in the image is not the processing target), step S384 of processing is skipped, and the processing proceeds to step S385.

In step S385, the decoding section 612 determines whether or not the value of the variable i is equal to or greater than 1 (i>=1). In a case where the value of the variable i is determined to be equal to or greater than 1, the processing proceeds to step S386.

In step S386, the decoding section 612 notifies completion of the CTU processing to the CTU line T+1 processing thread corresponding to a thread that processes the CTU line T+1 immediately below the CTU line T. When the completion of the CTU processing is notified, the processing proceeds to step S387.

Additionally, in step S385, in a case where the value of the variable i is determined to be less than 1 (the leftmost CTU in the image as a processing target has not completely been processed), step S386 of processing is skipped, and the processing proceeds to step S387.

In step S387, the decoding section 612 adds 1 to the value of the variable i (i=i+1). When the value of the variable i is incremented, the processing returns to step S374 in FIG. 23.

Figure 24:
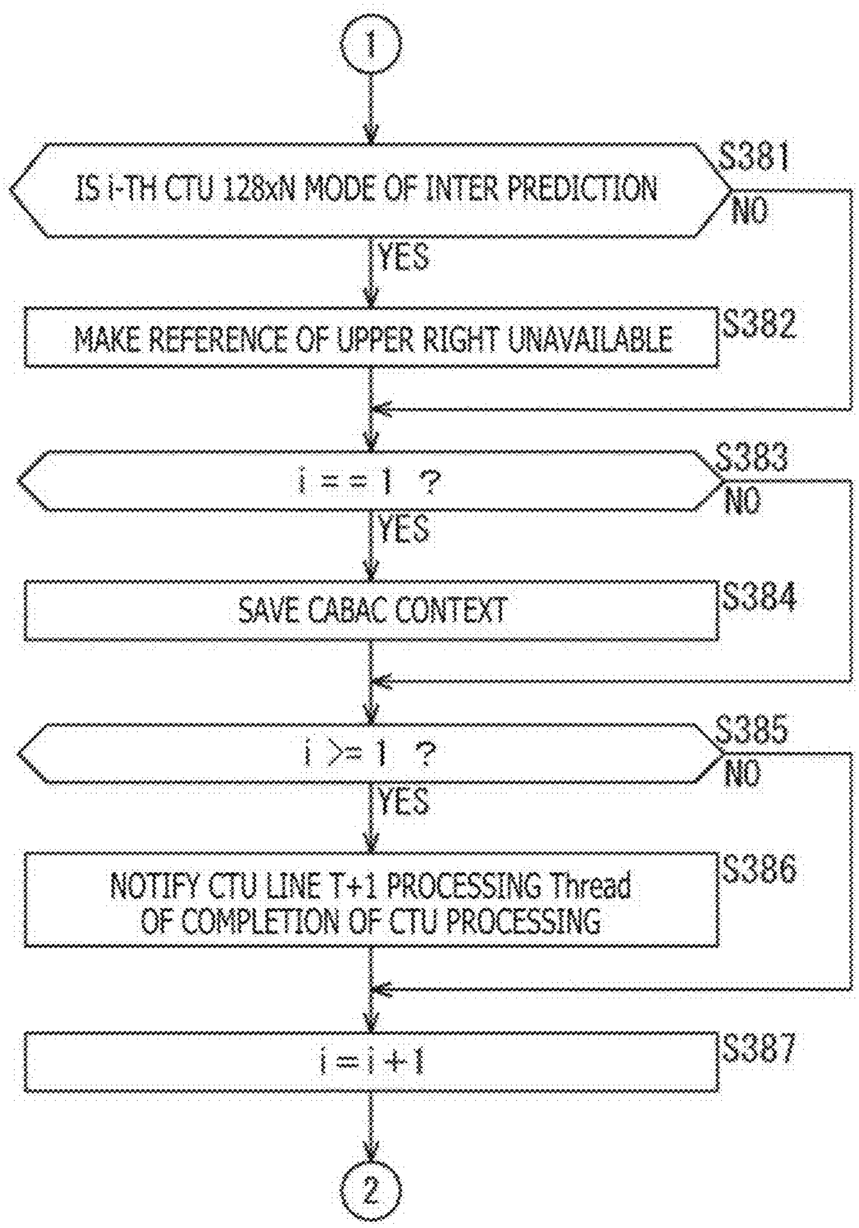
FIG. 24 is a flowchart continued from FIG. 23 and illustrating the example of the flow of the CTU processing.

In other words, the processing in steps S374 to S377 in FIG. 23 and the processing in steps S381 to S387 in FIG. 24 are repeated until all the CTUs in the CTU line T are processed. Then, the decoding section 612 determines that there is no unprocessed CTU (all the CTUs in the CTU line T have been processed) in step S374, the CTU processing ends, and the processing returns to FIG. 21.

By executing the processing as described above, the image decoding apparatus 600 can suppress a decrease in the parallelism of decoding.

6. Supplementary Feature

<Computer>

The sequence of steps of processing can be executed by hardware or software. In a case where the sequence of steps of processing is executed by software, a program included in the software is installed in the computer. Here, examples of the computer include a computer integrated in dedicated hardware and, for example, a general-purpose computer that can execute various types of functions by installing various types of programs.

Figure 25:
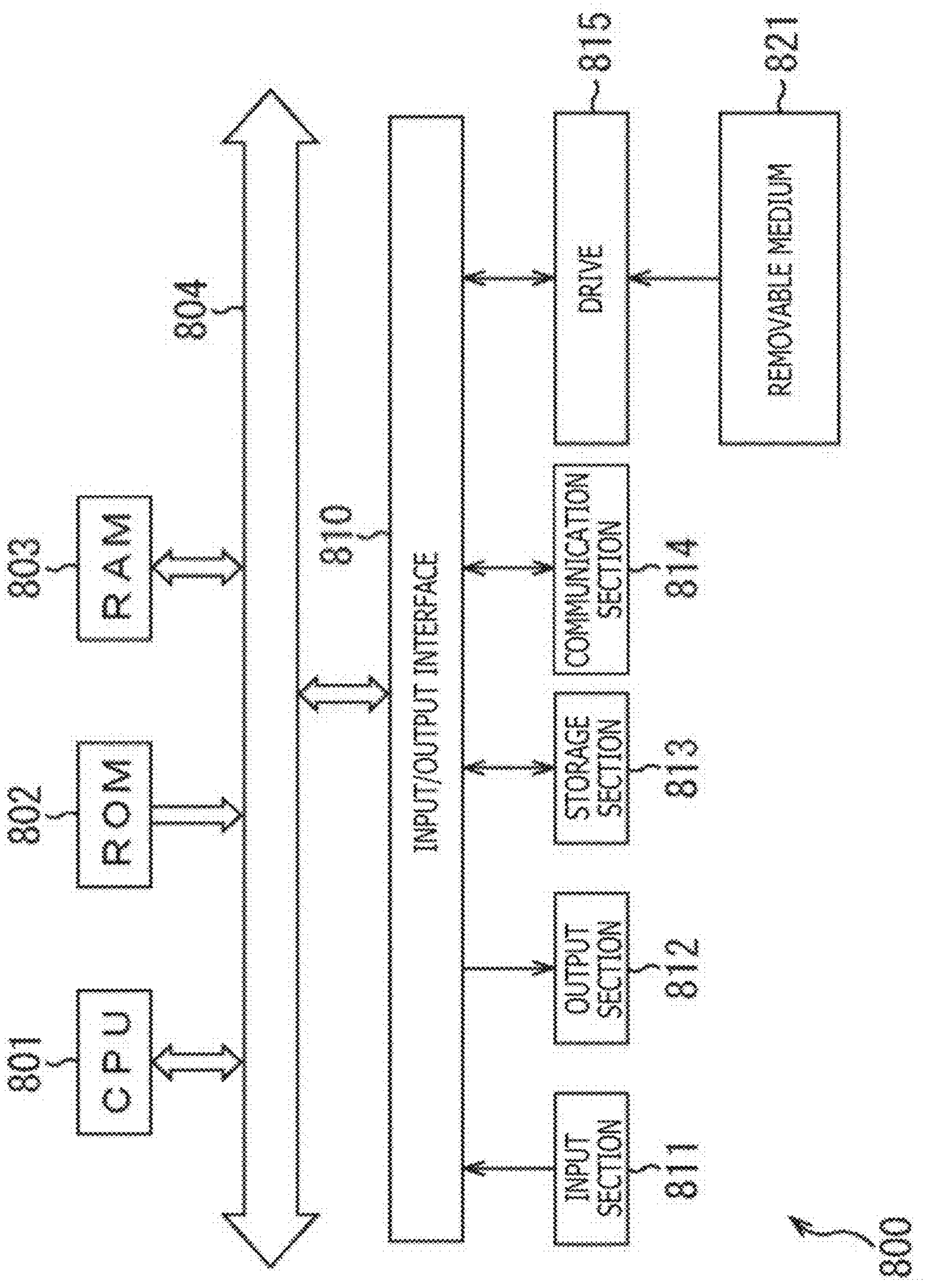
FIG. 25 is a block diagram illustrating a main configuration example of a computer.

FIG. 25 is a block diagram illustrating a configuration example of hardware of a computer that executes the sequence of steps of processing described above according to a program.

In a computer 800 illustrated in FIG. 25, a CPU (Central Processing Uni) 801, a ROM (Read Only Memory) 802, and a RAM (Random Access Memory) 803 are connected together via a bus 804.

An input/output interface 810 is also connected to the bus 804. The input/output interface 810 is connected to an input section 811, an output section 812, a storage section 813, a communication section 814, and a drive 815.

The input section 811 includes, for example, a keyboard, a mouse, a microphone, a touch panel, an input terminal, and the like. The output section 812 includes, for example, a display, a speaker, an output terminal, and the like. The storage section 813 includes, for example, a hard disk, a RAM disk, a nonvolatile memory, and the like. The communication section 814 includes, for example, a network interface. The drive 815 drives a removable medium 821 such as a magnetic medium, an optical disk, a magneto-optical disc, or a semiconductor memory.

In the computer configured as described above, the CPU 801, for example, loads a program stored in the storage section 813 into the RAM 803 via the input/output interface 810 and the bus 804 and executes the program, thus performing the sequence of steps of processing described above. The RAM 803 also stores, for example, data required for the CPU 801 to execute various steps of processing, as necessary.

The program executed by a computer (CPU 801) can be, for example, recorded in the removable medium 821 used as a package medium or the like for application. In such a case, the program can be installed in the storage section 813 via the input/output interface 810 by mounting the removable medium 821 to the drive 815.

Additionally, the program can be provided via a wired or wireless transmission medium such as a local area network, the Internet, or digital satellite broadcasting. In such a case, the program can be received by the communication section 814 and installed in the storage section 813.

Otherwise, the program can be installed in the ROM 802 or the storage section 813 in advance.

<Units of Information and Processing>

The data units in which the various types of information described above are set, and the data units corresponding to the targets of various types of processing are optional and are not limited to the examples described above. For example, the information and processing described above may be set for each of TUs (Transform Units), TBs (Transform Blocks), PUs (Prediction Units), PBs (Prediction Blocks), CUs (Coding Units), LCUs (Largest Coding Units), subblocks, blocks, tiles, slices, pictures, sequences, or components, or data in such data units may be processed. Needless to say, the data unit can be set for each piece of information and for each step of processing, and a common data unit need not be used for all the information and the processing. Note that these pieces of information are stored in any locations and may be stored in headers, parameter sets, and the like in the data units described above. Additionally, the information may be stored in a plurality of locations.

<Control Information>

Control information related to the present technique and described in the embodiments described above may be transmitted from the coding side to the decoding side. For example, control information (for example, enabled_flag) may be transmitted that is used to control whether or not to permit (or prohibit) application of the present technique described above. Additionally, for example, control information may be transmitted that indicates a target to which the present technique described above is applied (or a target to which the present technique described above is not applied). For example, control information may be transmitted that specifies the block size (upper or lower limit or both), frames, components, layers, or the like to which the present technique is applied (or for which the application is permitted or prohibited).

<Application Target of Present Technique>

The present technique can be applied to any image coding and decoding schemes. Specifically, insofar as consistent with the present technique described above, specifications of various types of processing related to image coding and decoding, such as transformation (inverse transformation), quantization (dequantization), coding (decoding), and prediction, are optional, and the specifications are not limited to the above-described examples. Additionally, insofar as consistent with the present technique described above, some of these types of processing may be omitted.

In addition, the present technique can be applied to multi-view image coding and decoding system for coding and decoding a multi-view image including images in a plurality of views. In such a case, it is sufficient to apply the present technique to coding and decoding in each view.

Further, the present technique can be applied to a layered image coding (scalable coding) and decoding system for coding and decoding a layered image that has a plurality of layers (has a hierarchical structure) to provide a scalability function for certain parameters. In such a case, it is sufficient to apply the present technique to coding and decoding of each layer.

The image processing apparatus, the image coding apparatus, and the image decoding apparatus according to the embodiments described above may be applied to various types of electronic equipment including, for example, transmitters and receivers (for example, television receivers and cellular phones) in satellite broadcasting, in wired broadcasting such as cable TV, in distribution on the Internet, and in distribution to terminals through cellular communication, or apparatuses (for example, hard disk recorders and cameras) that record images in media such as an optical disc, a magnetic disk, and a flash memory and that reproduce the images from these storage media.

Additionally, the present technique can be implemented as any configurations mounted in any apparatus or an apparatus included in a system, such as a processor used as a system LSI (Large Scale Integration) or the like (for example, a video processor), a module using a plurality of processors or the like (for example, a video module), a unit using a plurality of modules or the like (for example, a video unit), a set including the unit to which any other function is added (for example, video set), and the like (that is, as a configuration corresponding to a part of the apparatus).

Further, the present technique can be applied to a network system including a plurality of apparatuses. For example, the present technique can be applied to cloud services that provide services related to images (moving images) to any terminal such as a computer, AV (Audio Visual) equipment, a portable information processing terminal, or an IoT (Internet of Things) device.

Note that the system, apparatus, processing section, and the like to which the present technique is applied can be utilized in any field such as traffic, medical care, crime prevention, agriculture, the livestock industry, the mining industry, beauty care, factories, home electrical appliances, weather service, and nature surveillance. Additionally, they can be used for any purposes.

For example, the present technique can be applied to systems and devices used to provide content for viewing and the like. Additionally, the present technique can be applied to systems and devices used for traffic purposes such as administration of traffic conditions and automatic operation control. Further, for example, the present technique can be applied to systems and devices used for security purposes. Additionally, for example, the present technique can be applied to systems and devices used for automatic control of machines and the like. Further, for example, the present technique can be applied to systems and devices used for agriculture and the livestock industry. Additionally, the present technique can be applied to systems and devices that monitor, for example, the conditions of nature such as volcanoes, forests, and seas, wildlife, and the like. Furthermore, for example, the present technique can be applied to systems and devices used for sport purposes.

Others

Note that the "flag" as used herein refers to information used to distinguish a plurality of states from one another and includes information used to distinguish three or more states from one another as well as two states of true (1) and false (0). Consequently, values that may be taken by the "flag" may be a binary value of I/O or three or more values. Specifically, the number of bits included in the "flag" is optional, and the "flag" includes one or more bits. Additionally, identification information (including the flag) is assumed to be in a form in which difference information between the identification information and information used as a reference is included in a bit stream, as well as in a form in which the identification information is included in the bit stream. The "flag" and "identification information" as used herein include not only the information itself but also the difference information with respect to the reference information.

Additionally, various types of information (metadata and the like) related to coded data (bit stream) may be transmitted or recorded in any form as long as the information is associated with the coded data. Here, the term "associate" means that two pieces of data are configured such that, for example, when one piece of the data is processed, the other piece of the data can be used for (linked to) the processing. In other words, pieces of data associated with each other may be compiled into one data or used as individual data. For example, the information associated with the coded data (image) may be transmitted through a transmission path different from a transmission path through which the coded data (image) is transmitted. Additionally, for example, the information associated with the coded data (image) may be recorded in a recording medium different from a recording medium in which the coded data (image) is recorded (or may be recorded in a different recording area in the same recording medium). Note that the "association" may be performed on part of the data rather than the entire data. For example, an image and information corresponding to the image may be associated with each other in any unit such as a plurality of frames, one frame, or a portion within the frame.

Note that the terms "synthesize," "multiplex," "add," "integrate," "include," "store," "put into," "plug into," "insert," and the like mean that multiple objects are brought together and that, for example, coded data and metadata are compiled into one data, and represent one method for the above-described "association."

Additionally, embodiments of the present technique are not limited to the above-described embodiments and can be variously modified without departing from the scope of the present technique.

In addition, for example, a configuration described as one apparatus (or processing section) may be divided into a plurality of apparatuses (or processing sections). In contrast, a configuration described above as a plurality of apparatuses (or processing sections) may be brought together into one apparatus (or processing section). Further, needless to say, the configuration of each apparatus (or each processing section) may include additional components other than the components described above. Furthermore, a part of the configuration of one apparatus (or processing section) may be included in the configuration of another apparatus (or another processing section) as long as the apparatuses are substantially the same in the configuration or operation of the overall system.

Note that the system as used herein means a set of a plurality of components (apparatuses, modules (parts), or the like) regardless of whether or not all the components are located in the same housing. Consequently, a plurality of apparatuses housed in separate housings and connected together via a network and one apparatus with a plurality of modules housed in one housing are both systems.

Additionally, for example, the present technique can take a configuration of cloud computing in which one function is shared and cooperatively processed by a plurality of apparatuses via a network.

Additionally, for example, the above-described program can be executed in any apparatus. In such a case, it is sufficient to provide the apparatus with required functions (functional blocks or the like) and enable the apparatus to obtain required information.

Additionally, for example, each of the steps described above in the flowcharts can be shared by a plurality of apparatuses, instead of being executed by one apparatus. Further, in a case where one step includes a plurality of types of processing, the plurality of types of processing included in the one step can be shared by a plurality of apparatuses, instead of being executed by one apparatus. In other words, the plurality of types of processing included in the one step can be executed as a plurality of steps of processing. In contrast, processing described as a plurality of steps can be brought together into one step.

Note that, for the program executed by the computer, the steps of processing of describing the program may be chronologically executed according to the order described herein, may be executed in parallel, or may be individually executed at required timings such as a timing when the program is invoked. In other words, insofar as consistent with the present technique, the processing of the steps may be executed in an order different from the above-described order. Further, the processing of the steps of describing the program may be executed in parallel or combination with processing of another program.

Note that a plurality of the present techniques described herein can be implemented independently as a single technique, insofar as consistent with the present techniques. Needless to say, any plurality of the present techniques can be implemented together. For example, a part or all of the present technique described in any one of the embodiments can be combined with a part or all of the present technique described in another embodiment and can be implemented. Additionally, a part or all of any of the above-described present techniques can be implemented along with another technique not described above.

Note that the present technique can also take the following configurations.

(1)

An image processing apparatus including:

a coding section that codes coefficient data related to an image in parallel in each line of transformation blocks each used as a unit in which image data is transformed into the coefficient data.

(2)

The image processing apparatus according to (1), in which the coding section codes each line of the transformation blocks of the coefficient data related to the image such that the transformation blocks are sequentially coded one by one from a leftmost transformation block, and entropy-codes each of the transformation blocks by using an occurrence probability derived from preceding entropy coding.

(3)

The image processing apparatus according to (2), in which the coding section entropy-codes a leftmost transformation block in an uppermost line of the transformation blocks in the image by using an initial value of the occurrence probability, and entropy-codes a leftmost transformation block in each of second uppermost and subsequent lines of the transformation blocks in the image by using the occurrence probability derived from entropy coding of a second leftmost transformation block in a line of the transformation blocks immediately above the line to be coded.

(4)

The image processing apparatus according to (2), in which the coding section entropy-codes a leftmost transformation block in an uppermost line of the transformation blocks in the image by using an initial value of the occurrence probability, entropy-codes a leftmost transformation block in a line of transformation blocks belonging to a same coding tree unit as a coding tree unit of the transformation blocks immediately above the transformation blocks to be coded, the line corresponding to one of second uppermost and subsequent lines of the transformation blocks in the image, the coding tree unit corresponding to a topmost coding block in a tree structure, by using the occurrence probability derived from entropy coding of a second leftmost transformation block in a line of the transformation blocks immediately above the line to be coded, and entropy-codes a leftmost transformation block in a line of transformation blocks belonging to a coding tree unit different from a coding tree unit of the transformation blocks immediately above the transformation blocks to be coded, the line corresponding to one of second uppermost and subsequent lines of the transformation blocks in the image, by using the occurrence probability derived from entropy coding of a third leftmost transformation block in a line of the transformation blocks immediately above the line to be coded.

(5)

The image processing apparatus according to (1), in which the transformation block is a VPDU (Virtual Pipeline Data Unit).

(6)

The image processing apparatus according to (1), further including:

a prediction section that performs intra prediction on the image, in which, in the intra prediction of an upper left transformation block in a coding tree unit corresponding to a topmost coding block in a tree structure, the prediction section makes referencing of a lower right transformation block in a preceding coded coding tree unit unavailable.

(7)

The image processing apparatus according to (1), further including:

a prediction section that performs inter prediction on the image, in which, in the inter prediction of an upper left transformation block in a coding tree unit corresponding to a topmost coding block in a tree structure, the prediction section makes referencing of a motion vector of a lower right transformation block in a preceding coded coding tree unit unavailable.

(8)

The image processing apparatus according to (1), further including:

a prediction section that performs inter prediction on the image, in which, in the inter prediction of a prediction block corresponding to a processing unit of the inter prediction and having a horizontal length identical to a horizontal length of a coding tree unit that corresponds to a topmost coding block in a tree structure, the prediction section makes referencing of a motion vector of a transformation block at upper right of the prediction block unavailable.

(9)

The image processing apparatus according to (1), in which, for a prediction block corresponding to a processing unit of the inter prediction and having a vertical length identical to a vertical length of a coding tree unit that corresponds to a topmost coding block in a tree structure, the coding section codes, for each of the prediction blocks, mode information indicating a mode of the inter prediction and codes a residual data between the image and a prediction image for each of transformation blocks included in the prediction block.

(10)

An image processing method including:

coding coefficient data related to an image in parallel in each line of transformation blocks each corresponding to a unit in which image data is transformed into the coefficient data.

(11)

An image processing apparatus including:

a decoding section that decodes coded data obtained by coding coefficient data related to an image, in parallel in each line of transformation blocks each corresponding to a unit in which image data is transformed into the coefficient data.

(12)

The image processing apparatus according to (11), in which the decoding section decodes the coded data in each line of the transformation blocks of the coefficient data related to the image such that the transformation blocks are sequentially decoded one by one from a leftmost transformation block, and entropy-decodes the coded data of each transformation block by using an occurrence probability derived from preceding entropy decoding.

(13)

The image processing apparatus according to (12), in which the decoding section entropy-decodes the coded data of a leftmost transformation block in an uppermost line of the transformation blocks in the image by using an initial value of the occurrence probability, and entropy-decodes the coded data of a leftmost transformation block in each of second uppermost and subsequent lines of the transformation blocks in the image by using the occurrence probability derived from entropy decoding of the coded data of a second leftmost transformation block in a line of the transformation blocks immediately above the line to be decoded.

(14)

The image processing apparatus according to (12), in which the decoding section entropy-decodes the coded data of a leftmost transformation block in an uppermost line of the transformation blocks in the image by using an initial value of the occurrence probability, entropy-decodes the coded data of a leftmost transformation block in a line of transformation blocks belonging to a same coding tree unit as a coding tree unit of the transformation blocks immediately above the transformation blocks to be decoded, the line corresponding to one of second uppermost and subsequent lines of the transformation blocks in the image, the coding tree unit corresponding to a topmost coding block in a tree structure, by using the occurrence probability derived from entropy decoding of the coded data of a second leftmost transformation block in a line of the transformation blocks immediately above the line to be decoded, and entropy-decodes the coded data of a leftmost transformation block in a line of transformation blocks belonging to a coding tree unit different from a coding tree unit of the transformation blocks immediately above the transformation blocks to be decoded, the line corresponding to one of second uppermost and subsequent lines of the transformation blocks in the image, by using the occurrence probability derived from entropy decoding of the coded data of a third leftmost transformation block in a line of the transformation blocks immediately above the line to be decoded.

(15)

The image processing apparatus according to (11), in which the transformation block is a VPDU (Virtual Pipeline Data Unit).

(16)

The image processing apparatus according to (11), further including:

a prediction section that performs intra prediction on the image, in which, in the intra prediction of an upper left transformation block in a coding tree unit corresponding to a topmost coding block in a tree structure, the prediction section makes referencing of a lower right transformation block in a preceding decoded coding tree unit unavailable.

(17)

The image processing apparatus according to (11), further including:

a prediction section that performs inter prediction on the image, in which, in the inter prediction of an upper left transformation block in a coding tree unit corresponding to a topmost coding block in a tree structure, the prediction section makes referencing of a motion vector of a lower right transformation block in a preceding decoded coding tree unit unavailable.

(18)

The image processing apparatus according to (11), further including:

a prediction section that performs inter prediction on the image, in which, in the inter prediction of a prediction block corresponding to a processing unit of the inter prediction and having a horizontal length identical to a horizontal length of a coding tree unit that corresponds to a topmost coding block in a tree structure, the prediction section makes referencing of a motion vector of a transformation block at upper right of the prediction block unavailable.

(19)

The image processing apparatus according to (11), in which, for a prediction block corresponding to a processing unit of the inter prediction and having a vertical length identical to a vertical length of a coding tree unit that corresponds to a topmost coding block in a tree structure, the decoding section decodes, for each of the prediction blocks, the coded data of mode information indicating a mode of the inter prediction and decodes the coded data of a residual data between the image and a prediction image for each of transformation blocks included in the prediction block.

(20)

An image processing method including:

decoding coded data obtained by coding coefficient data related to an image, in parallel in each line of transformation blocks each corresponding to a unit in which image data is transformed into the coefficient data.

REFERENCE SIGNS LIST

500: Image coding apparatus
501: Control section
515: Coding section
522: Prediction section
600: Image decoding apparatus
612: Decoding section
619: Prediction section

The invention claimed is:

1. An image encoding apparatus comprising:

circuitry configured to:

divide an image into a plurality of Coding Tree Units (CTUs), the divided image comprising a plurality of CTU lines in parallel;

divide each CTU of the plurality of CTUs into a plurality of quadtree blocks, wherein each quadtree block of the plurality of quadtree blocks is a processing unit having a size smaller than that of the CTU;

determine whether Wavefront Parallel Processing (WPP) is applied to code the plurality of CTUs, wherein the WPP has a delay of one CTU between adjacent CTU lines of the plurality of CTU lines;

upon determining that the WPP is not applied to code the plurality of CTUs, perform a first intra prediction of an upper right quadtree block of a current CTU of a current CTU line of the plurality of CTU lines, the first intra prediction with reference to an upper left quadtree block of the current CTU of the current CTU line, a lower left quadtree block of an adjacent upper CTU of the adjacent upper CTU line, a lower right quadtree block of the adjacent upper CTU of the adjacent upper CTU line, and a lower left quadtree block of a non-adjacent upper right CTU of an adjacent upper CTU line; and upon determining that the WPP is applied to code the plurality of CTUs, perform a second intra prediction of the upper right quadtree block of the current CTU, the second intra prediction with reference to the upper left quadtree block of the current CTU of the current CTU line, the lower left quadtree block of the adjacent upper CTU of the adjacent upper CTU line, and the lower right quadtree block of the adjacent upper CTU of the adjacent upper CTU line, the second intra prediction excluding the lower left quadtree block of the non-adjacent upper right CTU.

2. The image encoding apparatus according to claim 1, wherein the circuitry is configured to:

based on determining that the WPP is applied to code the plurality of CTUs, code each CTU line of the plurality of CTU lines such that the plurality of CTUs are sequentially coded one by one from a leftmost CTU in each CTU line.

3. The image encoding apparatus according to claim 2, wherein the circuitry is configured to code each of the plurality of CTUs for each of the plurality of quadtree blocks.

4. The image encoding apparatus according to claim 3, wherein the circuitry is configured to entropy-code each of the plurality of quadtree blocks by using an occurrence probability derived from entropy coding of a corresponding preceding quadtree block.

5. The image encoding apparatus according to claim 4, wherein the circuitry is configured to:

entropy-code a first quadtree block in a leftmost CTU of the plurality of CTUs in an uppermost line of the coding tree units in the image by using an initial value of an occurrence probability, and entropy-code a first quadtree block in a leftmost CTU of the plurality of CTUs in each of second uppermost and subsequent lines of the coding tree units in the image, by using an occurrence probability derived from entropy coding of a last quadtree block in a leftmost coding tree unit in a line of the coding tree units immediately above the line to be coded.

6. An image processing method performed by an electronic device, the method comprising:

dividing an image into a plurality of Coding Tree Units (CTUs), the divided image comprising a plurality of CTU lines in parallel;

dividing each CTU of the plurality of CTUs into a plurality of quadtree blocks, wherein each quadtree block of the plurality of quadtree blocks is a processing unit having a size smaller than that of the CTU;

determining whether Wavefront Parallel Processing (WPP) is applied to code the plurality of CTUs, wherein the WPP has a delay of one CTU between adjacent CTU lines of the plurality of CTU lines;

upon determining that the WPP is not applied to code the plurality of CTUs, performing a first intra prediction of an upper right quadtree block of a current CTU of a current CTU line of the plurality of CTU lines, the first intra prediction with reference to an upper left quadtree block of the current CTU of the current CTU line, a lower left quadtree block of an adjacent upper CTU of the adjacent upper CTU line, a lower right quadtree block of the adjacent upper CTU of the adjacent upper CTU line, and a lower left quadtree block of a non-adjacent upper right CTU of an adjacent upper CTU line; and upon determining that the WPP is applied to code the plurality of CTUs, performing a second intra prediction of the upper right quadtree block of the current CTU, the second intra prediction with reference to the upper left quadtree block of the current CTU of the current CTU line, the lower left quadtree block of the adjacent upper CTU of the adjacent upper CTU line, and the lower right quadtree block of the adjacent upper CTU of the adjacent upper CTU line, the second intra prediction excluding the lower left quadtree block of the non-adjacent upper right CTU.

7. An image decoding apparatus comprising: circuitry configured to:

perform decoding on an image that has been divided into a plurality of Coding Tree Units (CTUs), the divided image comprising a plurality of CTU lines in parallel, each CTU of the plurality of CTUs divided into a plurality of quadtree blocks, wherein each quadtree block of the plurality of quadtree blocks is a processing unit having a size smaller than that of the CTU;

determine whether Wavefront Parallel Processing (WPP) is applied to code the plurality of CTUS, wherein the WPP has a delay of one CTU between adjacent CTU lines of the plurality of CTU lines;

upon determining that the WPP is not applied to code the plurality of CTUs, perform a first intra prediction of an upper right quadtree block of a current CTU of a current CTU line of the plurality of CTU lines, the first intra prediction with reference to an upper left quadtree block of the current CTU of the current CTU line, a lower left quadtree block of an adjacent upper CTU of the adjacent upper CTU line, a lower right quadtree block of the adjacent upper CTU of the adjacent upper CTU line, and a lower left quadtree block of a non-adjacent upper right CTU of an adjacent upper CTU line; and upon determining that the WPP is applied to code the plurality of CTUs, perform a second intra prediction of the upper right quadtree block of the current CTU, the second intra prediction with reference to the upper left quadtree block of the current CTU of the current CTU line, the lower left quadtree block of the adjacent upper CTU of the adjacent upper CTU line, and the lower right quadtree block of the adjacent upper CTU of the adjacent upper CTU line, the second intra prediction excluding the lower left quadtree block of the non-adjacent upper right CTU.

8. The image decoding apparatus according to claim 7, wherein the circuitry is configured to:

based on determining that the WPP is applied to code the plurality of CTUs, decode each CTU line of the plurality of CTU lines such that the plurality of CTUs are sequentially decoded one by one from a leftmost CTU in each CTU line.

9. The image decoding apparatus according to claim 8, wherein the circuitry is configured to decode each of the plurality of CTUs for each of the plurality of quadtree blocks.

10. The image decoding apparatus according to claim 9, wherein the circuitry is configured to entropy-decode each of the plurality of quadtree blocks by using an occurrence probability derived from entropy decoding of a corresponding preceding quadtree block.

11. The image decoding apparatus according to claim 10, wherein the circuitry is configured to:

entropy-decode a first quadtree block in a leftmost CTU of the plurality of CTUs in an uppermost line of the coding tree units in the image by using an initial value of an occurrence probability, and entropy-decode a first quadtree block in a leftmost CTU of the plurality of CTUs in each of second uppermost and subsequent lines of the coding tree units in the image, by using an occurrence probability derived from entropy coding of a last quadtree block in a leftmost coding tree unit in a line of the coding tree units immediately above the line to be coded.

12. An image processing method performed by an electronic device, the method comprising:

performing decoding on an image that has been divided into a plurality of Coding Tree Units (CTUs), the divided image comprising a plurality of CTU lines in parallel, each CTU of the plurality of CTUs divided into a plurality of quadtree blocks, wherein each quadtree block of the plurality of quadtree blocks is a processing unit having a size smaller than that of the CTU;

determining whether Wavefront Parallel Processing (WPP) is applied to code the plurality of CTUs, wherein the WPP has a delay of one CTU between adjacent CTU lines of the plurality of CTU lines;

upon determining that the WPP is not applied to code the plurality of CTUs, performing intra prediction of an upper right quadtree block of a current CTU of a current CTU line of the plurality of CTU lines, the first intra prediction with reference to an upper left quadtree block of the current CTU of the current CTU line, a lower left quadtree block of an adjacent upper CTU of the adjacent upper CTU line, a lower right quadtree block of the adjacent upper CTU of the adjacent upper CTU line, and a lower left quadtree block of anon-adjacent upper right CTU of an adjacent upper CTU line; and upon determining that the WPP is applied to code the plurality of CTUs, performing a second intra prediction of the upper right quadtree block of the current, the second intra prediction with reference to the upper left quadtree block of the current CTU of the current CTU line, the lower left quadtree block of the adjacent upper CTU of the adjacent upper CTU line, and the lower right quadtree block of the adjacent upper CTU of the adjacent upper CTU line, the second intra prediction excluding the lower left quadtree block of the non-adjacent upper right CTU.

* * * * *